United States Patent
Lupoli et al.

(10) Patent No.: US 12,153,590 B2
(45) Date of Patent: *Nov. 26, 2024

(54) METHOD AND SYSTEM FOR STORING, RETRIEVING, AND MANAGING DATA FOR TAGS

(71) Applicant: Motedata Corporation, Leesburg, VA (US)

(72) Inventors: Peter Lupoli, Venice, FL (US); Jay Kesan, Leesburg, VA (US); Peter R. Cappello, Goleta, CA (US)

(73) Assignee: Motedata Corporation, Leesburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,258

(22) Filed: Jun. 13, 2023

(65) Prior Publication Data
US 2023/0325394 A1  Oct. 12, 2023

Related U.S. Application Data

(63) Continuation of application No. 17/408,586, filed on Aug. 23, 2021, now abandoned, which is a continuation of application No. 16/665,417, filed on Oct. 28, 2019, now Pat. No. 11,100,118, which is a continuation of application No. 15/811,926, filed on Nov. 14, 2017, now Pat. No. 10,459,930, which is a continuation of application No. 14/977,025, filed on Dec. 21, 2015, now Pat. No. 9,817,870, which is a continuation of application No. 14/609,470, filed on Jan. 30, 2015, now Pat. No. 9,218,520, which is a continuation of application No. 13/668,571, filed on Nov. 5, 2012, now Pat. No. 8,952,814, which is a continuation of application No. 13/114,139, filed on May 24, 2011, now Pat. No. 8,314,705, which is a continuation of application No. 11/657,895, filed on Jan. 24, 2007, now Pat. No. 7,956,742, which is a continuation-in-part of application No. 10/952,789, filed on Sep. 30, 2004, now Pat. No. 7,388,488.

(60) Provisional application No. 60/515,449, filed on Oct. 30, 2003.

(51) Int. Cl.
| | |
|---|---|
| *G06F 16/2457* | (2019.01) |
| *G06F 16/21* | (2019.01) |
| *G06F 16/2455* | (2019.01) |
| *G06F 16/29* | (2019.01) |
| *G06F 16/81* | (2019.01) |
| *G06K 7/10* | (2006.01) |
| *G06Q 10/08* | (2023.01) |

(52) U.S. Cl.
CPC ...... *G06F 16/24578* (2019.01); *G06F 16/211* (2019.01); *G06F 16/24564* (2019.01); *G06F 16/29* (2019.01); *G06F 16/81* (2019.01); *G06K 7/10366* (2013.01); *G06Q 10/08* (2013.01)

(58) Field of Classification Search
CPC ........... G06K 7/10366; G06K 19/0723; G06K 19/0725
See application file for complete search history.

*Primary Examiner* — Nabil H Syed
(74) *Attorney, Agent, or Firm* — Kasha Law LLC; John R. Kasha; Kelly L. Kasha

(57) ABSTRACT

This invention relates generally to a method and system for storing, retrieving, and managing data for tags that are associated in some manner to any type of object. More particularly, the present invention writes data to these tags, reads data from these tags, and manages data that is written to and/or read from these tags. In addition, the invention accesses and/or stores data associated with tags from or into repositories, constructs and maintains data structures from these repositories and responds to queries using the data structures.

3 Claims, 19 Drawing Sheets

Network Packet Format for Tag-ID Broadcast

Protocol ID (byte 0)
Protocol ID (byte 1)
Protocol ID (byte 2)
Protocol ID (byte 3)
Tag ID Length (=n)
Tag ID (byte 0)
.
.
.
Tag ID (byte n-1)
Current Time (byte 0)
Current Time (byte 1)
Current Time (byte 2)
Current Time (byte 3)
RSA Signature (byte 0)
.
.
.
RSA Signature (byte 15)

*Fig. 6A*

Network Packet Format for Central Authority Broadcast

Protocol ID (byte 0)
Protocol ID (byte 1)
Protocol ID (byte 2)
Protocol ID (byte 3)
Current Time (byte 0)
Current Time (byte 1)
Current Time (byte 2)
Current Time (byte 3)
RSA Signature (byte 0)
.
.
.
RSA Signature (byte 15)

*Fig. 6B*

Network Packet Format for Tag-ID-Map Broadcast

```
Protocol ID (byte 0)
Protocol ID (byte 1)
Protocol ID (byte 2)
Protocol ID (byte 3)
Current Time (byte 0)
Current Time (byte 1)
Current Time (byte 2)
Current Time (byte 3)
Number of Entries (=m) (byte 0)
Number of Entries (byte 1)
Number of Entries (byte 2)
Number of Entries (byte 3)
Entry #1
Tag ID Length (=n₁)
Tag ID (byte 0)
.
.
.
Tag ID (byte n₁-1)
Number of Encounters (byte 0)
Number of Encounters (byte 1)
Number of Encounters (byte 2)
Number of Encounters (byte 3)
Tag ID Length (=nₘ)
Tag ID (byte 0)
.
.
.
Tag ID (byte nₘ-1)
Number of Encounters (byte 0)
Number of Encounters (byte 1)
Number of Encounters (byte 2)
Number of Encounters (byte 3)
RSA Signature (byte 0)
.
.
.
RSA Signature (byte 15)
```

*Fig. 6C*

Network Packet Format for Tag-ID Broadcast

Protocol ID (byte 0)
Protocol ID (byte 1)
Protocol ID (byte 2)
Protocol ID (byte 3)
Tag ID Length (=n)
Tag ID (byte 0)
.
.
.
Tag ID (byte n-1)
Current Time (byte 0)
Current Time (byte 1)
Current Time (byte 2)
Current Time (byte 3)
RSA Signature (byte 0)
.
.
.
RSA Signature (byte 15)

*Fig. 8A*

Network Packet Format for Control-Authority Broadcast (Enable)

Protocol ID (byte 0)
Protocol ID (byte 1)
Protocol ID (byte 2)
Protocol ID (byte 3)
Current Time (byte 0)
Current Time (byte 1)
Current Time (byte 2)
Current Time (byte 3)
RSA Signature (byte 0)
.
.
.
RSA Signature (byte 15)

*Fig. 8B*

Network Packet Format for Control-Authority Broadcast    (Disable)

Protocol ID (byte 0)
Protocol ID (byte 1)
Protocol ID (byte 2)
Protocol ID (byte 3)
Current Time (byte 0)
Current Time (byte 1)
Current Time (byte 2)
Current Time (byte 3)
RSA Signature (byte 0)
:
:
RSA Signature (byte 15)

*Fig. 8C*

Network Packet Format for Tag-ID Broadcast

Protocol ID (byte 0)
Protocol ID (byte 1)
Protocol ID (byte 2)
Protocol ID (byte 3)
Tag ID Length (=n)
Tag ID (byte 0)
.
.
Tag ID (byte n-1)
Current Time (byte 0)
Current Time (byte 1)
Current Time (byte 2)
Current Time (byte 3)
RSA Signature (byte 0)
.
.
RSA Signature (byte 15)

*Fig. 10A*

Network Packet Format for Control-Authority Add Tag

Protocol ID (byte 0)
Protocol ID (byte 1)
Protocol ID (byte 2)
Protocol ID (byte 3)
Target Tag ID Length (=n)
Target Tag ID (byte 0)
.
.
Target Tag ID (byte n-1)
Sensitive Tag ID Length (=m)
Sensitive Tag ID (byte 0)
.
.
Sensitive Tag ID (byte m-1)
Sensitive Tag Public RSA Key (byte 0)
.
.
Sensitive Tag Public RSA Key (byte 15)
Current Time (byte 0)
Current Time (byte 1)
Current Time (byte 2)
Current Time (byte 3)
RSA Signature (byte 0)
.
.
RSA Signature (byte 15)

*Fig. 10B*

Network Packet Format for Control-Authority Delete Tag

Protocol ID (byte 0)
Protocol ID (byte 1)
Protocol ID (byte 2)
Protocol ID (byte 3)
Target Tag ID Length (=n)
Target Tag ID (byte 0)
．
．
．
Target Tag ID (byte n-1)
Sensitive Tag ID Length (=m)
Sensitive Tag ID (byte 0)
．
．
．
Sensitive Tag ID (byte m-1)
Current Time (byte 0)
Current Time (byte 1)
Current Time (byte 2)
Current Time (byte 3)
RSA Signature (byte 0)
．
．
．
RSA Signature (byte 15)

*Fig. 10C*

```xml
<?xml version="1.0" encoding="UTF-8"?>

<pmlcore:Sensor xmlns:pmlcore="urn:....:PmlCore:xml:schema:v1_0"
         xmlns:pmlunv="urn:autoid:specification:....:xml:schema:v1_0"
         xmlns:xsi="http://www.w3.org/2001/XMLSchema-instance"
         xsi:schemaLocation="urn:autoid:....:PmlCore:xml:schema:v1_0 PmlCore_1.xsd">
  <pmlunv:ID>urn:epc:1.4.16.36</pmlunv:ID>
  <pmlcore:Observation>
    <pmlunv:ID>00000001</pmlunv:ID>
    <pmlcore:DateTime>2002-11-06T13:04:34-06:00</pmlcore:DateTime>
    <pmlcore:Tag>
      <pmlunv:ID>urn:epc:1.2.24.400</pmlunv:ID>
      <pmlcore:Sensor>
        <pmlunv:ID>urn:epc:1.12.8.128</pmlunv:ID>
        <pmlcore:Observation>
          <pmlcore:DateTime>2002-11-06T11:00:00-06:00</pmlcore:DateTime>
          <pmlcore:Data>
            <pmlcore:XML>
              <TemperatureReading xmlns="http://sensor.example.org/">
                <Unit>Celsius</Unit>
                <Value>5.3</Value>
              </TemperatureReading>
            </pmlcore:XML>
          </pmlcore:Data>
        </pmlcore:Observation>
        <pmlcore:Observation>
          <pmlcore:DateTime>2002-11-06T12:00:00-06:00</pmlcore:DateTime>
          <pmlcore:Data>
            <pmlcore:XML>
              <TemperatureReading xmlns="http://sensor.example.org/">
                <Unit>Celsius</Unit>
                <Value>5.3</Value>
              </TemperatureReading>
            </pmlcore:XML>
          </pmlcore:Data>
        </pmlcore:Observation>
      </pmlcore:Sensor>
    </pmlcore:Tag>
  </pmlcore:Observation>
</pmlcore:Sensor>
```

*Fig. 12*

METHOD AND SYSTEM FOR STORING, RETRIEVING, AND MANAGING DATA FOR TAGS

CROSS-REFERENCE TO RELATED APPLICATION

This application is a continuation of U.S. patent application Ser. No. 17/408,586, filed Aug. 23, 2021, which is a continuation of U.S. patent application Ser. No. 16/665,417, filed Oct. 28, 2019, now U.S. Pat. No. 11,100,118, which is a continuation of U.S. patent application Ser. No. 15/811,926, filed Nov. 14, 2017, now U.S. Pat. No. 10,459,930, which is a continuation of U.S. patent application Ser. No. 14/977,025, filed Dec. 21, 2015, now U.S. Pat. No. 9,817,870, which is a continuation of U.S. patent application Ser. No. 14/609,470, filed Jan. 30, 2015, now U.S. Pat. No. 9,218,520, which is a continuation of U.S. patent application Ser. No. 13/668,571, filed Nov. 5, 2012, now U.S. Pat. No. 8,952,814, which is a continuation of U.S. patent application Ser. No. 13/114,139, filed May 24, 2011, now U.S. Pat. No. 8,314,705, which is a continuation of U.S. patent application Ser. No. 11/657,895, filed Jan. 24, 2007, now U.S. Pat. No. 7,956,742, which is a continuation-in-part of U.S. patent application Ser. No. 10/952,789, filed Sep. 30, 2004, now U.S. Pat. No. 7,388,488, which claims priority from U.S. Provisional Patent Application Ser. No. 60/515,449, filed Oct. 30, 2003, the contents of all of which is incorporated herein by reference.

FIELD OF THE INVENTION

This invention relates generally to a method and system for storing, retrieving, and managing data for tags that are associated in some manner to any type of object. More particularly, the present invention writes data to these tags, reads data from these tags, and manages data that is written to and/or read from these tags.

In addition, the invention stores and/or accesses data associated with tags into or from repositories, constructs and maintains data structures from these repositories and responds to queries using the data structures.

BACKGROUND OF THE INVENTION

This invention involves a method and system for storing, retrieving, and managing data for any type of tag that is associated in any type of manner to any type of object, physical or abstract, animate or inanimate. A tag is any device that sends, receives and/or stores data about whatever it is monitoring or is associated with; it includes many different types such as radio frequency identification device (RFID) tags, laser tags, cellular phones, devices that receive and transmit signals from television networks, any type of satellite communication network such as a Global Positioning System (GPS), etc. A tag may be powered by any type of power source such as a DC power source, an AC power source, solar, etc. Identification devices are further described in U.S. Pat. No. 3,752,960 to Charles Walton, entitled, "Electronic Identification & Recognition System," the contents of which are herein incorporated by reference. The types of objects that may be associated with tags include but are not limited to people, animals, plants, things of any kind, real property such as houses, lots, condominiums, mobile homes and townhouses, valuable items such as paintings, diamonds, jewelry, watches, and antiques, movable items such as automobiles, airplanes, military vehicles, bicycles, motorcycles, boats, ships, components thereof, locations, environmental conditions, abstractions, concepts, phenomena, etc. Associations between tags and objects can be of any type including but not limited to one-to-many, many-to-one or one-to-one, physical, logical, etc. Physical associations may include attaching and/or inserting the tag to its associated object.

The present invention is adapted for a wide variety of uses. For example, the method and system of the present invention may be used to authenticate valuable items, to manage inventory such as the tracking of objects of any kind through manufacturing, supply chain, distribution, etc. to the point of sale and beyond, to track the movements of objects such as people, animals, plants, movable items, etc., to retrieve historical data such as price histories from things such as valuable items and real property, to retrieve any type of health data such as medical conditions, treatment history, medication instructions, etc. from people and animals, to track any type of health conditions such as heart rate, pulse rate, temperature, the amount of different things in the blood such as oxygen, sugar, etc. for people and animals.

The present invention may also be used to learn who owns a certain entity, where an entity is located, when a movable entity was last within a spatial vicinity, what entities were within a spatial vicinity of a specific entity, E [either during a specified temporal period or over E's entire recorded lifetime], what entities had a particular attribute value (e.g., temperature) when they were in a spatial vicinity of any entity that had a particular attribute value during the time it was within the spatial vicinity, etc. Exemplary queries include the following:

"What are the addresses and purchase prices of the houses in Stony Brook, N.Y. that have the same brand of water heater as the water heater in the house at 1234 Belvedere Road, Stony Brook, N.Y.?"

"What are the current traffic conditions of U.S. Highway 101 in the city of Santa Barbara?"

"What were the traffic conditions of U.S. Highway 101 in the city of Santa Barbara on 2005 Oct. 12 between 10:00 and 10:12?"

"Give me the current location of food items that originated in Bangkok, Thailand that, after last Saturday, were within 1 mile of chemical compounds which, at any time, passed through San Pedro harbor."

"Give me the name of the doctor of every person who was in Peking at the same time as any food item was in Peking, which was in Bangkok, Thailand after person X was diagnosed with Avian Flu."

"Give me the location of every product produced in any manufacturing facility on any day that any member of group X was present at that manufacturing facility."

"Give me the name of the doctor of every person whose homocysteine level increases by more than 15% within 12 months of purchasing a prescription drug that contains lycopene manufactured in Belgium."

The first three queries could be asked by a passenger in a car, or by a car on behalf of its driver. The benefits are similar to those attributed to traffic reports on radio stations.

Many different benefits may arise from the various uses of the present invention. For example, its use may decrease the costs of determining the value of a thing such as a valuable item because, for instance, the price history and other similar data for that item could be easily stored and retrieved from its associated tag. The availability of price history from a tag associated with a house as well as that from other houses in the same neighborhood may prevent a seller from charging an excessively high value to a buyer with little or no knowledge of the actual value of the house. Use of the present invention may prevent the fraudulent substitution of a counterfeit for a valuable item because identification data from the item's associated tag could be used to verify that item's authenticity. Use of the present invention may prevent a car owner from passing off a damaged car as an undamaged one to an unsuspecting buyer because a car's accident history could be stored and retrieved from the car's associated tag. Use of the present invention could prevent the theft of military secrets because clearance information could be easily accessed from the tag associated with a person to determine whether that person should have access to such secrets. Use of the present invention may avoid injury or even death to athletes that may occur while they are performing because their heart rate, temperature, and other medical conditions could be easily monitored. For similar reasons, a coach could use the present invention to quickly determine which players are too fatigued to be effective; an athletic recruiter could use the present invention to determine which players are better able to handle the rigors of competition; and athletic trainers could use the present invention to tailor training programs to particular athletes. Use of the present invention may ease the authentication of evidence at trial because chain of custody could be easily retrieved from the evidence's associated tag at trial. Use of the present invention will further automate and simplify the management of inventory.

The present invention may also facilitate the timely location of tainted food, or people who have been exposed to a virus. It may associate a group of people with an event through a long chain of prior conditions or events. It may be used to predict the popularity of an item (e.g., a song, stock, book, or vacation resort) by examining high order derivatives with respect to time of purchase patterns in areas or sets of people that are deemed to be trend setters. It can, for example, be used to determine if any congressman was in contact with (e.g., communicated via the telephone with, or was in the same room as) someone whose car or cellular phone, in a 48-hour period (before and after that point in time), was within ¼ mile of the Chinese Embassy. Monitoring complex events (e.g., flu outbreaks, and bioterrorism as manifested via Emergency Room data) can be formulated as standing queries, obviating the expenses associated with a special-purpose system for such monitoring.

Tags and similar devices have been disclosed in other references but no prior art reference discloses the use of such tags in a system and method for storing, retrieving and managing data for a variety of applications including authentication, tracking, health care monitoring, health care management, knowledge acquisition, etc. In contrast, for example, U.S. Pat. Nos. 6,440,096, 5,358,514, 5,193,540, 6,107,102, and 6,405,066 discuss the implantation of microdevices in people. U.S. Pat. Nos. 5,606,260, 4,892,709, 5,367,878, 6,152,181, 5,834,790, 5,186,001, 5,839,056, and 5,144,298 discuss the use of microdevices as sensors or controllers.

Accordingly, there exists a need for a system and method for storing, retrieving, and managing data for any type of tag that is associated in any type of manner to any type of object.

Moreover, there exists a need for a system and method for accessing and/or storing data associated with tags from or into many repositories, constructing and maintaining data structures from these repositories, and responding to queries using data structures.

SUMMARY OF THE INVENTION

The invention provides a system and method for storing, retrieving, and managing data for any type of tag that is associated in any type of manner to any type of object for a variety of applications.

In particular, it is an aspect of the present invention to present a system for storing, retrieving and managing data for one or more objects comprising:
  one or more tags associated with the one or more objects;
  one or more components communicating with at least one of the tags;
  at least one receiver for receiving control data and information data from at least one of said components into at least one of said tags wherein said information data is about the object that is associated with said at least one tag;
  at least one transmitter for transmitting at least a portion of said information data to at least one of said components in accordance with said control data; and
  at least one communication network for facilitating said communicating among said components and said tags;
  wherein at least one of said components transmits at least one query to receive at least a portion of said information data about said object associated with said at least one tag.

It is a further aspect of the present invention to present a method for storing, retrieving, and managing data for one or more objects comprising the steps of:
  associating one or more tags with the one or more objects;
  communicating with at least one of said tags from one or more components;
  receiving control data and information data from at least one of said components into at least one of said tags wherein said information data is about the object that is associated with said at least one tag;
  transmitting at least a portion of said information data from said at, least one tag to at least one of said components in accordance with said control data; and
  transmitting from said at least one of said components at least one query to receive at least a portion of said information data about said object associated with said at least one tag.

It is a further aspect of the present invention to present a method for managing children comprising the steps of:
  associating one or more tags with the one or more children;
  transmitting control data and information data to said one or more tags;
  receiving said information data into said one or more tags, said information data concerning one or more of the following: the identity of people that came into contact with the one or more children; at least one measurement of at least one environmental condition to which the one or more children was exposed, the academic performance of the one or more children, the athletic performance of the one or more children, at least one measurement of the medical condition of the one or more children; and
  transmitting at least a portion of said information data from said at least one tag in accordance with said control data.

It is a further aspect of the present invention to present a method for retrieving and organizing data that is associated with one or more tags having one or more identifiers from a plurality of repositories comprising the steps of:

responding to queries and search requests;
retrieving said data from one or more of said repositories; and
linking together at least one portion of said data that is associated with at least one of said one or more identifiers.

It is a further aspect of the present invention to present a system for retrieving and organizing data that is associated with one or more tags having one or more identifiers from a plurality of repositories comprising:
means for responding to queries and search requests;
means for retrieving said data from one or more of said repositories; and
means for linking together at least one portion of said data that is associated with at least one of said one or more identifiers.

BRIEF DESCRIPTION OF THE DRAWINGS

These and other aspects and features of the invention will be more clearly understood from the following detailed description along with the accompanying drawing figures, wherein:

FIGS. 6a, 6b, and 6c show exemplary formats of the tag-identifier broadcast, the central authority broadcast and the tag identifier map broadcast respectively.

FIGS. 8a, 8b, and 8c show exemplary formats of the tag-identifier broadcast, the control authority enable and the control authority disable respectively.

FIGS. 10a, 10b, and 10c show exemplary formats of the tag-identifier broadcast, the control authority add tag broadcast and the control authority delete tag broadcast respectively.

FIG. 12 shows an exemplary abbreviated PML file.

FIG. 16 also shows, in block (B), an exemplary hierarchical tag data file from a distributor. FIG. 16 further shows, in block (C), the identification of hierarchies in blocks (A) and (B), based on the tag identifier value.

DETAILED DESCRIPTION

The invention provides a system and method for storing, retrieving, and managing data for any type of tag that is associated in any type of manner to any type of object (physical or abstract, animate or inanimate) for a variety of applications.

While the present invention will be explained within the context of several different applications such as the authentication of objects including valuable items and evidence, and the monitoring of children by their parents, the present invention can be applied to any application which would benefit from the storage, retrieval and management of data for tags that are associated with any kind of object. These applications include the exchange of objects such as real property, goods, and service, monitoring the vital signs of the ill, the elderly and athletes, athletic training programs, monitoring environmental conditions, traffic, and consumer behavior in various settings such as amusement parks, shopping centers, casinos, tracking the location of people such as prisoners, students, foreigners, military personnel, and workers in classified areas, tracking the location of goods of any type such as inventory from manufacturing, the supply chain, distribution, etc. to the point of sale and beyond, tracking the location of classified material, tracking the manufacturing, sale and repair histories of goods such as machinery, cars, airplanes, trains, and components thereof, monitoring movement of people and things such as vehicles, traffic, etc. at locations such as a battlefield, a highway, etc., monitoring the flow of oil and other fluids in pipelines, etc.

Figure 1:
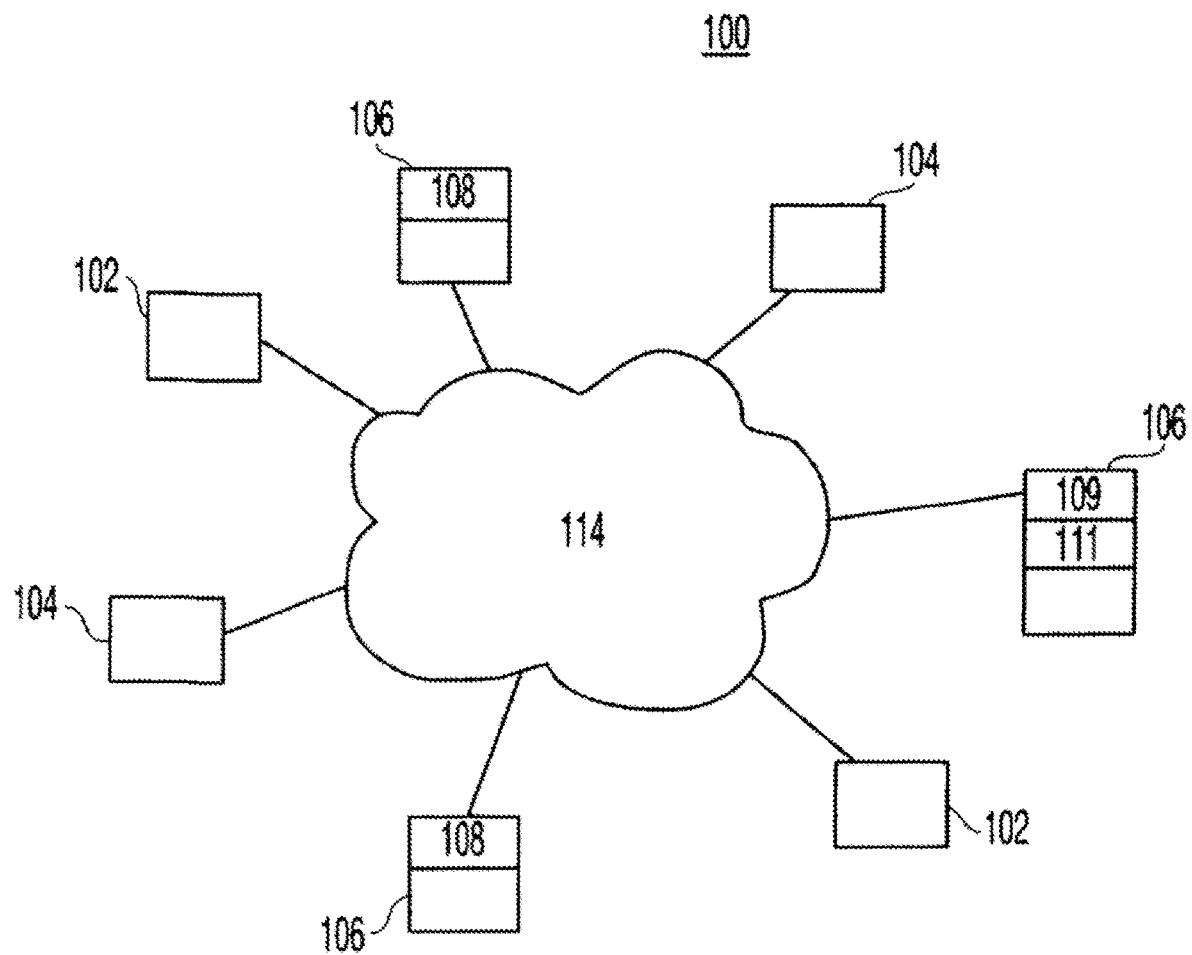
FIG. 1 is a block diagram showing the major operational elements of the invention.

FIG. 1 is a block diagram 100 showing the major operational elements of the invention. The invention may include one or more tags 102 that may be associated with objects of any type including people, animals, plants, things of any kind, real property such as houses, lots, condominiums, mobile homes and townhouses, valuable items such as paintings, diamonds, jewelry, watches, and antiques, vehicles such as automobiles, airplanes, military vehicles, bicycles, motorcycles, boats, ships, components, locations, environmental conditions, abstractions, concepts, phenomena, etc. Associations between tags and objects can be of any type including one-to-many, many-to-one or one-to-one. These associations may be physical, logical, etc. Physical associations may include attaching and/or inserting the tag to or in its associated object. Logical associations may include information in a database such as a table that may establish a correspondence between one or more tags and one or more objects by their identification numbers.

The tags 102 may be one of a variety of a different types including Radio Frequency Identification Device (RFID) tags, laser tags, cellular phones, devices that receive and transmit signals from a Global Positioning System (GPS), etc. The tags 102 may be powered by any kind of power source such as a DC power source, an AC power source, solar power, etc. Each tag 102 may have the ability to receive data, store data, sense data and/or transmit data. Data may be received and transmitted to other tags 102, sensors 104, computers 106, and database management systems 110. The tags 102 may have the ability to sense data from its associated object, its environment, etc. Data sensed from an associated object such as a person or animal may include medical data such as temperature, oxygen content in the blood, heart rate, etc. Data sensed from the environment may include the content of various gases, poisons, and pollutants in the air or water, the temperature, the humidity, barometric pressure, chemicals, motion, light, sound, etc.

The present invention 100 may further include sensors 104. Sensors 104 may be of any type and may sense any kind of data. Sensors 104 may be powered by any type of power source such as an AC power source, a DC power source, solar power, etc. Sensors 104 may include thermometers, motion detectors, Global Positioning System (GPS) devices, chemical sensors, etc. Computers 106 may include database management systems 110 for the storage and management of data associated with tags 102 in any way including data transmitted to and/or retrieved from the tags 102. Data may be transmitted to tags 102 from computers 106 for storage within the tags 102 and may be transmitted from the tags 102 to computers 106. Data retrieved from tags 102 may be stored and managed in database management system 110.

The present invention may further include a communication network 114, which may include a variety of different types of components and software to communicate different types of data among the tags 102, sensors 104, computers 106, etc. These components and software may include modulator/demodulators (modems), satellites, up and down frequency converters including those for communications with the satellites, audio/video encoders, routers, hubs, bridges, etc. In one embodiment, the communication network 114 may be a cellular telephone network. In another embodiment, the communication network 114 may be any type of satellite network such as GPS. In another embodiment, the communication network may be a television network. In another embodiment, the communication network 114 may include the Internet. Communication may be accomplished on the Internet by one or more internet applications, including the World Wide Web. Communication network 114 may be an intranet or an extranet. An intranet is a private network typically a local area network (LAN) or a wide area network (WAN) that enables the use of Internet-based applications in a secure, private environment. Extranets are intranet-type networks that link multiple sites or organizations using intranet related technologies.

The World Wide Web is built on a protocol called the Hypertext Transport Protocol (HTTP). Computers 106 may include browser software 108 for requesting data input by tags 104 and sensors 102, and/or data stored in a database management system 110. Requests for data from browser software 108 may be handled by server software 109. The server software 109 may locate the requested data and may transmit it to the requesting browser software 108. Computers 106 may further include application server software 111, which may extend the capabilities of the server software 109. In particular, the application server software 111 may pre-process a page of data before it is sent to the requesting browser software 108.

In one embodiment, the application server software 111 is a Cold Fusion application. Cold Fusion is a World Wide Web application for creating dynamic page applications and interactive Web sites by combining standard Hypertext Markup Language (HTML) files with Cold Fusion Markup Language (CFML) instructions, as specified in "The Macromedia Cold Fusion 5 Web Application Construction Kit," Ben Forta and Nate Weiss, Fourth Edition, (hereinafter, "Cold Fusion 5"), Chapter 1, the contents of which are herein incorporated by reference. HTML is a page markup language that enables the creation and layout of pages and forms. In one embodiment of the present invention, a Cold Fusion application defines fill-out forms for entry of data including the data to control the operation of the tags 102 and sensors 104 and queries for data.

In one embodiment, a Cold Fusion application 111 is used to retrieve or update data in the database management system 110. The Cold Fusion application 111 may access the database management system 110 through an interface called Open Database Connectivity (ODBC), which is a standard Application Programming Interface (API) for accessing information from different database systems and different formats, as explained in ColdFusion 5, Chapter 6, the contents of which are herein incorporated by reference.

In an alternate embodiment, data may be input using a program written in a language that manipulates text, files and information. An exemplary language is PERL as specified in "Programming Perl," Larry Ward and Randal L. Schwartz, O'Reilly & Associates, Inc., March 1992, the contents of which are herein incorporated by reference.

The database 110 may be a distributed database, which may be stored among many computers 106 or may be a central database. Database 110 may be of any type including a relational database or a hierarchical database. Databases and database management systems are described in Database System Concepts, Henry F. Korth, Abraham Silberschatz, McGraw-Hill 1986, Chapter 1, the contents of which are herein incorporated by reference. Exemplary databases 110 include: Microsoft Structured Query Language (SQL) Server, Microsoft Access 1.0, 2.0 and 7.0, Microsoft FoxPro 2.0, 2.5 and 2.6, Oracle 7.0, Borland Paradox 3.X and 4.X, Borland dBase III and dBase IV, and Microsoft Excel 3.0, 4.0 and 5.0.

In one embodiment, data is retrieved, inserted, updated or deleted from database 110 using Structured Query Language (SQL). SQL is described in "SAMS Teach Yourself SQL," $2^{nd}$ Edition, Ben Forta, the contents of which are herein incorporated by reference.

The present invention may include additional components to manage the data received from tags 102, sensors 104 and elsewhere. These additional components may include a search tool. In one embodiment, the search tool is Verity. Data may be organized into one or more collections. Verity may then be used to index the collection and compile metadata about the collection to enable it to search the collection quickly. Conceptually, Verity's usefulness is attributed to its ability to index and compile information about the collection and use this information to quickly search the collection when asked to do so. Searches and queries may be specified using Verity operators including concept operators such as STEM, WORD, and WILDCARD, proximity operators such as NEAR and PHRASE, relation operators such as CONTAINS, MATCHES, STARTS, ENDS and SUBSTRING, search modifiers such as CASE, MANY, NOT, and ORDER and score operators such as YES, NO, COMPLEMENT, PRODUCT, and SUM. Search forms and search results pages may be defined using HTML with Cold Fusion tags. The creation and searching of collections, and the display of search results using Verity is described in ColdFusion 5, Chapter 36, the contents of which are herein incorporated by reference. Web Browser software 108 may display the web pages from the server software 109 including the fill-out form for data input, the fill-out form for input of search criteria and the search results text data. The present invention may also display audio and video data input by tags 102 and sensors 104 using an on-demand video and audio streaming server, such as Real- Server as explained in "RealServer Administration and Content Creation Guide", the contents of which are herein incorporated by reference.

In another embodiment, the search engine may be a commercial search engine such as Alta Vista, Google, Yahoo, etc. A commercial search engine may be integrated into the present invention using Cold Fusion tags as explained in ColdFusion 5, Chapter 36.

Before performing the search, the search engine may optimize the queries as specified in Database System Concepts, Henry F. Korth, Abraham Silberschatz, McGraw-Hill 1986, Chapter 9, the contents of which are herein incorporated by reference.

Figure 2:
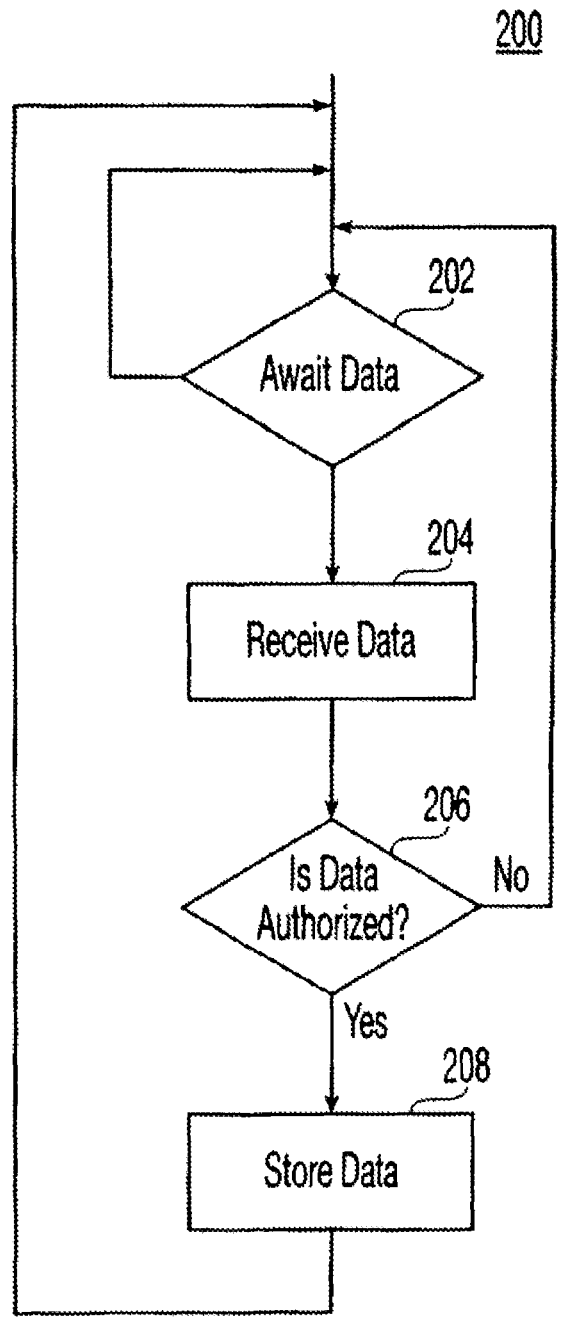
FIG. 2 is a dataflow diagram describing the storage of data to tags 102 that are associated with any kind of object.

FIG. 2 is a dataflow diagram 200 describing the storage of data to tags 102 that are associated with any kind of object. A dataflow diagram is a graph whose nodes are processes and whose arcs are dataflows. See Object Oriented Modeling and Design, Rumbaugh, J., Prentice Hall, Inc. (1991), Chapter 1, the contents of which are herein incorporated by reference. The data may consist of control data that governs the operation of the tag 102 such as by defining what types of data the tag 102 is authorized to receive and/or transmit, the identification of those components (i.e., other tags 102, computers 106, browser software 108, server software 109, sensors 104, etc.) that may transmit data to or receive data from the tag 102, and may consists of information for storage within the tag 102. In step 202, the tag 102 may await the receipt of data. Control proceeds to step 204 when data is received. In step 204, the tag 102 may receive data, which may have been transmitted from any type of component including but not limited to a computer 106, browser software 108, server software 109, a database 110, a sensor 104, another tag 102, itself, etc. In step 206, a check may be done to determine whether or not the received data is authorized to be stored in the tag 102. Step 206 may include checking whether the source of the data has the authority to store the type of data that was received at the tag 102.

The checking may be performed by a variety of different techniques including but not limited to those using cryptography, the art and science of keeping messages secure, and any other type of secure communication including an intranet, a virtual private network (VPN), etc. Cryptography may be used in the present invention for authentication, integrity and/or non-repudiation. Authentication enables a receiver of a message to ascertain its origin. Integrity enables a receiver of a message to verify that the message has not been modified in transit. Non-repudiation prevents a sender of a message from falsely denying that it did indeed send the message.

In one embodiment, a symmetric algorithm is used. With symmetric algorithms, the encryption key can be calculated from the decryption key and vice versa. The key must remain secret to keep the communication secret. In another embodiment, a public key algorithm (also called asymmetric algorithm) is used. With a public key algorithm, the decryption key cannot be computed from the encryption key in a reasonable amount of time. The encryption key is made public and is called the public key. The decryption key is kept secret and is called the private key. In another embodiment, digital signatures may be used. With digital signatures, a message is encrypted with a private key by a sender, thereby signing the message and decrypted with a public key by the recipient, thereby verifying the signature. Exemplary digital signature algorithms include Rivest-Shamir-Adelman (RSA) and the Digital Signature Algorithm (DSA) proposed by the National Institute of Standards and Technology (NIST). Cryptography, including symmetric algorithms, public-key algorithms and digital signatures are described in "Applied Cryptography" by Bruce Schneier, Chapters 1, 2, 19 and 20, the contents of which are herein incorporated by reference.

In another embodiment, the checking may be done by some form of password verification.

If the check in step 206 indicates that the received data is authorized to be stored in the tag 102, then control proceeds to step 208. In step 208, the data is stored in the tag 102. After step 208, control proceeds to step 202, where the tag 102 waits for the receipt of new data. If the check in step 206 indicates that the received data is not authorized to be stored in the tag 102, then control returns to step 202.

Figure 3A:
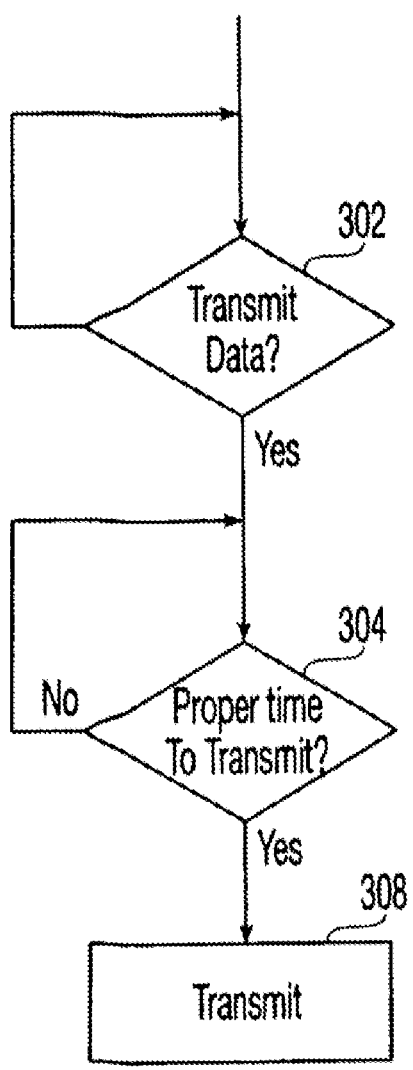
FIGS. 3a and 3b are dataflow diagrams describing the transmission of data from tags 102.
Figure 3B:
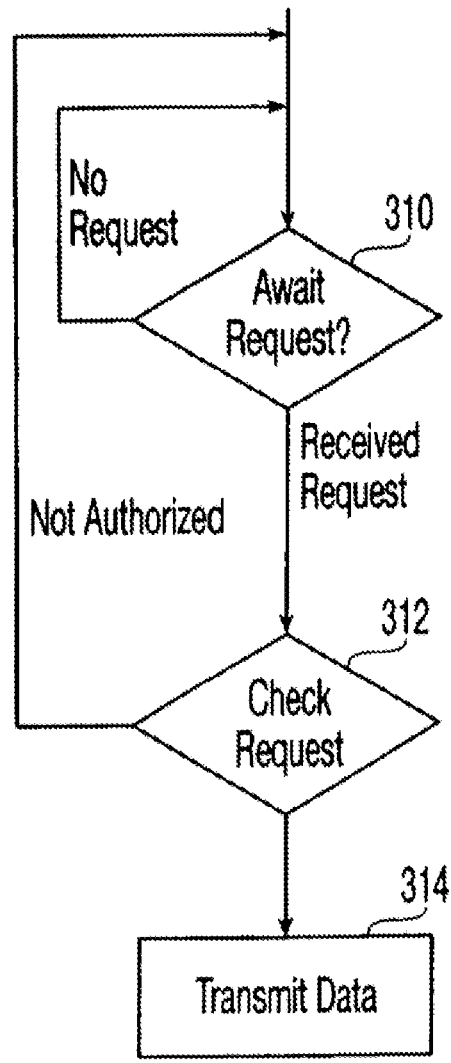

FIGS. 3a and 3b are dataflow diagrams describing the transmission of data from tags 102. In step 302, a check is performed to determine whether the tag 102 should be transmitting data without solicitation and if so, what type of data it should be transmitting. This may be done by checking control settings within the tag 102. If the check in step 302 indicates that the tag 102 should be transmitting data, control proceeds to step 304. In step 304, a check is performed to determine whether the data should be transmitted at that time. This check can be done by comparing a clock in the tag 102 to a predetermined time setting. If the check in step 304 indicates that data should be transmitted, then control proceeds to step 308. Otherwise, control remains in step 304. In step 308, the data is transmitted from the tag 102. After step 308, control returns to step 302.

In step 310, the tag 102 awaits a request for data. Control remains in step 310 until such a request is received after which it proceeds to step 312. In step 312, the tag 102 may receive the request, which may have been transmitted from any type of component including but not limited to a client 106, a server 108, a database 110, a sensor 104, another tag 102, etc. In step 312, a check may be done to determine whether or not the received request is authorized to receive a response in the tag 102. Step 312 may include checking whether the source of the request has the authority to receive the type of data that is requested. The checking may be performed by a variety of different techniques including those using cryptography, as explained in detail above. The checking may alternatively be done by some form of password verification. If the check in step 312 indicates that the request is authorized to receive data in response, then control proceeds to step 314. In step 314, the requested data is transmitted to the source of the request. After step 314, control proceeds to step 310, where the tag 102 waits for the receipt of a new request. If the check in step 312 indicates that the request is not authorized to receive data in response, then control returns to step 310.

In one embodiment, communication between one or more of the tags 102 and one or more of the sensors 104 with the server software 109 may be performed using a Wireless Application Protocol (WAP), which is described in ColdFusion 5, Chapter 34, the contents of which are incorporated by reference.

The present invention may have many different uses. For example, it could be used by parents to monitor their children's activities. A parent may associate a tag 102 to a child by any means such as by physically attaching or implanting the tag 102 on the child. From browser software 108 or elsewhere, a parent may transmit control data to the child's tag 102 to indicate that the tag 102 should accept data from other tags 102 associated with particular people, sensors 104 such as global positioning system (GPS) satellites identifying the child's location throughout the day or environmental sensors 104 identifying the content of the air or water (i.e., toxins) to which the child is exposed. The tag 102 on the child executes the process for the storage of data in tags 102 illustrated by the flow diagram of FIG. 2 in order to analyze and store the control information sent by the parent. At a subsequent time, the parent may transmit one or more queries from browser software 108 or elsewhere to learn the identity of the people that came into contact with the child, to retrieve test scores or notes from a teacher that the child may have received that day, the quality of the air and water to which the child was exposed and the child's movements. The tag 102 associated with the child executes the process for transmitting data from the child's tag 102 illustrated by the flow diagrams of FIGS. 3a and 3b in order to respond to the parent's query.

The parent may, in the alternative, transmit additional control data to the child's tag 102 from browser software 108 or elsewhere instructing the child's tag to periodically transmit data from the tag 102 to a database 110. At any subsequent time, the parent may transmit one or more queries from browser software 108 or elsewhere to a database 110 to learn the same information about the child.

Figure 4A:
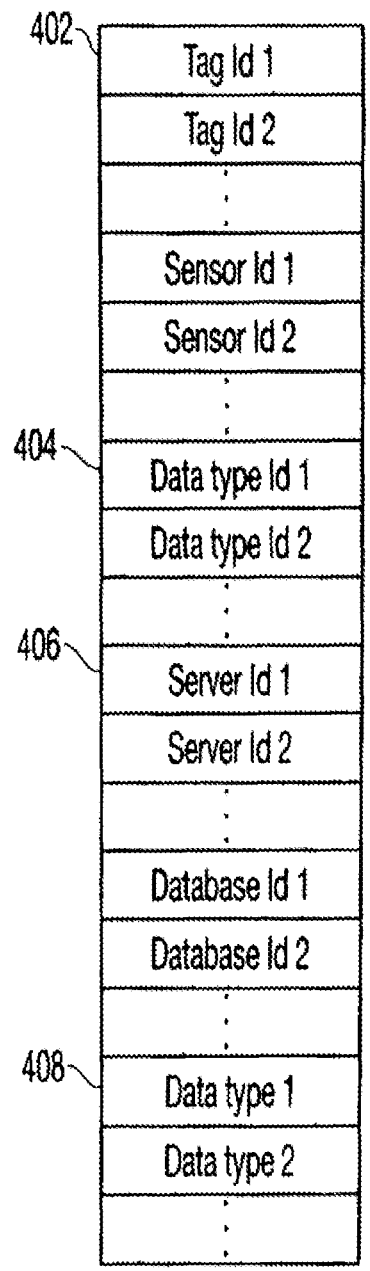
FIG. 4a displays a sample fill-out form 400 completed by a parent at a client computer 106 to control the operation of the child's tag 102.

FIG. 4a displays a sample fill-out form 400 completed by a parent at browser software 108 or elsewhere to control the operation of the child's tag 102. The fill-out form may contain one or more of the following fields:

Authorized Components For Receipt Table 402: This field specifies the components (i.e., tags, sensors, etc.) from which the child's tag may receive data.

Authorized Data For Receipt Table 404: This field specifies the types of data (i.e., data identifying the people associated with the tags 102 with which the child came into contact, test scores, teacher notes, environmental data, location data, etc.) that the child's tag 102 may receive.

Authorized Components For Transmission Table 406: This field specifies the components (i.e., database 110, etc.) to which the child's tag may transmit data.

Authorized Data For Transmission 408: This field specifies the types of data that the child's tag 102 may transmit.

Figure 4B:
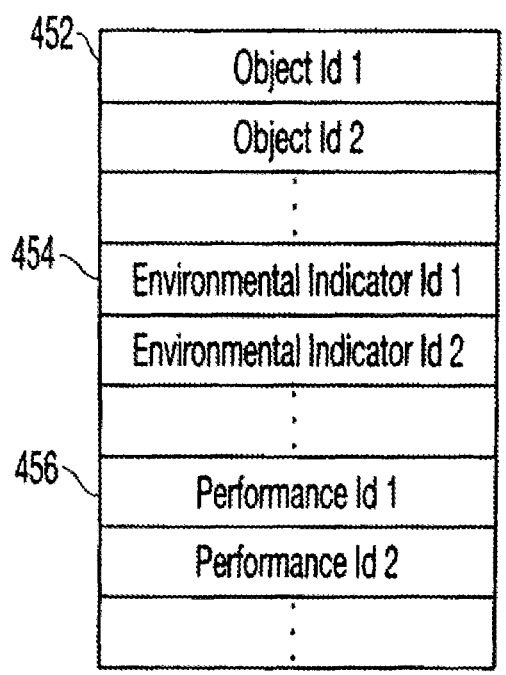
FIG. 4b displays a sample fill-out form 450 completed by a parent at a client computer 106 to retrieve data from the child's tag 102 or from a database 110.

FIG. 4b displays a sample fill-out form 450 completed by a parent at browser software 108 or elsewhere to retrieve data from the child's tag 102 or from a database 110. The fill-out form may contain one or more of the following fields:

Identification Query 452: This field requests the identify of the tagged objects such as people and animals that came into contact with the child.

Environmental Query 454: This field requests the content of the water and air to which the child had contact.

Performance Query 456: This field requests data on the child's behavior, academic performance, and athletic performance.

The present invention may be used to authenticate objects such as valuable items, sports memorabilia, and evidence. A vendor may associate a tag 102 to a valuable item such as a diamond or painting by any means such as by physically attaching or implanting the tag 102 on the item. From browser software 108 or elsewhere, a vendor may transmit control data to the object's tag 102 to indicate that the tag 102 should accept data from other tags 102 identifying the people associated with the other tags 102, sensors 104 such as global positioning system (GPS) satellites identifying the object's location throughout the day or environmental sensors 104 identifying the content of the air or water (i.e., toxins) to which the object is exposed. The tag 102 on the object executes the process for the storage of data in tags 102 illustrated by the flow diagram of FIG. 2 in order to analyze and store the control information sent by the vendor. At a subsequent time, the vendor can transmit one or more queries from browser software 108 or elsewhere to learn the identity of the people that handled the object, the quality of the air and water to which the object was exposed, the object's movements, the chain of title, the chain of possession, and the identity of the object's manufacturers, retailers, and distributors. The tag 102 associated with the object executes the process for transmitting data from the object's tag 102 illustrated by the flow diagrams of FIGS. 3a and 3b in order to respond to the vendor's query.

The vendor may, in the alternative, transmit additional control data to the object's tag 102 from browser software 108 or elsewhere instructing the object's tag 102 to periodically transmit data from the tag 102 to a database 110. At any subsequent time, the vendor may transmit one or more queries from browser software 108 or elsewhere to the database 110 to learn information about the object.

Another embodiment of the invention performs proximity tracking. In this embodiment, an event may be recorded within a tag when it comes within a range of other tags. These recorded events may be later sent to a database. This embodiment may be used generally to track the objects that have come into proximity with another object. For example, this embodiment may be used to track the people that have come into contact with a child or the places where a child has been. This embodiment may also be used to track the movement of objects with respect to locations within a secure facility.

In one embodiment, the tags may contain one or more of the following: a radio transmitter, a radio receiver, a memory, control software, a processor and a clock. The memory may include a RAM and a ROM. The control software may be stored in the ROM. The processor may be of a type that consumes less power.

The tags may contain one or more data structures including a tag identifier, a tag identifier map and a time field. The tag identifier may be a variable length string of up to 255 bytes and may be used to distinguish tags from each other. The tag identifier map may map a tag identifier to a public key and a counter. In one embodiment, the tag identifier map is implemented with a hash table. In another embodiment, the tag identifier is implemented with a binary search tree. The tag identifier map may be initialized with the public keys of certain tags such as those that are expected to be encountered and/or those that are determined to be sensitive. This scheme enables tags to quickly discard messages from tags with invalid signatures. Entries in the tag identifier map may be discarded after the map becomes full. Entries may be discarded in any order such as first-in-first-out (FIFO), least recently used (LRU), etc. The time field may be a four byte unsigned integer and may contain the current time in any form such as Greenwich Mean Time (GMT).

Figure 5:
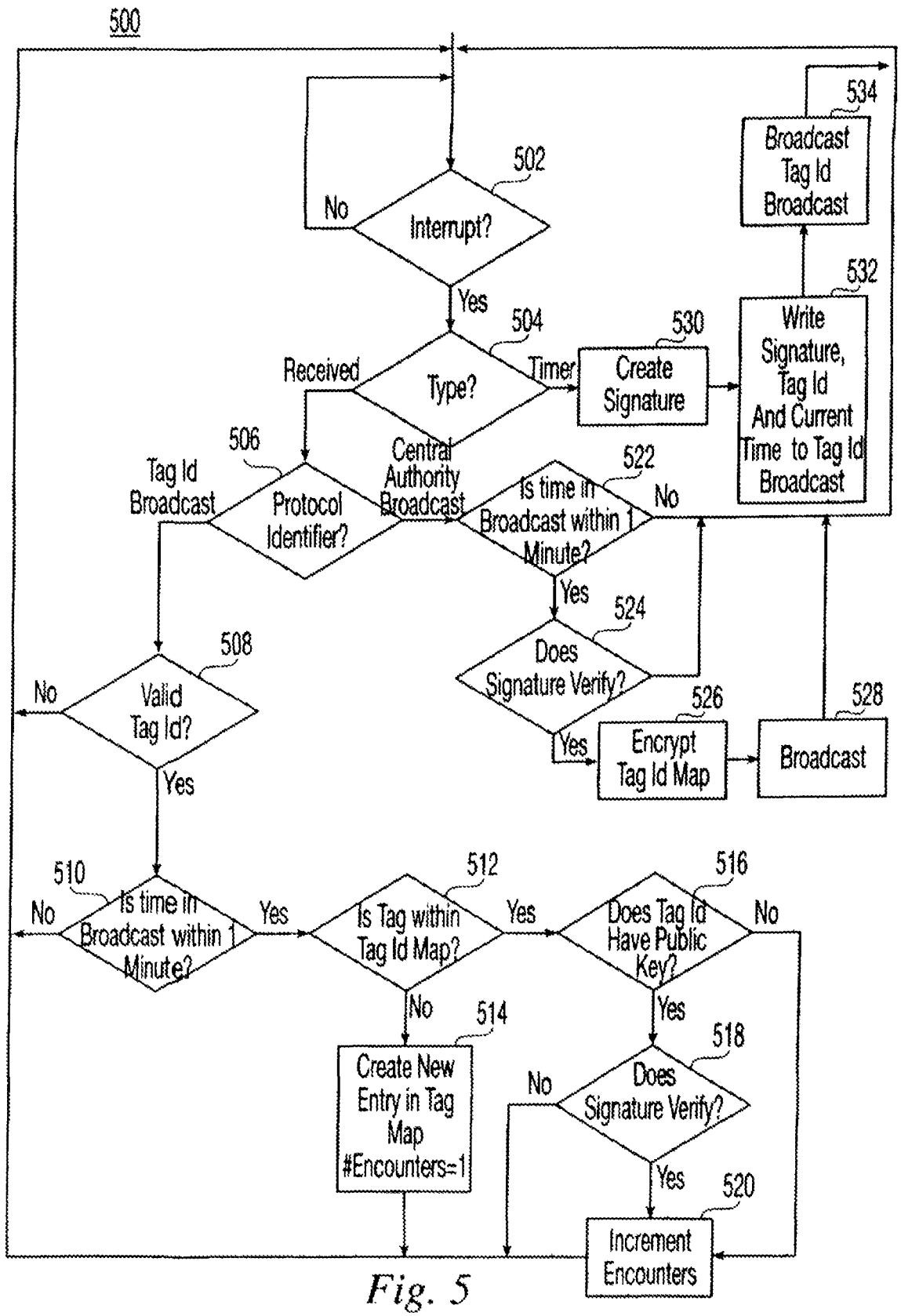
FIG. 5 is a data flow diagram 500 illustrating the operation of one embodiment of a tag for proximity checking.

FIG. 5 is a data flow diagram 500 illustrating the operation of one embodiment of a tag for proximity checking. The tag waits for an interrupt in step 502. In step 504, the type of interrupt is determined. If the interrupt is a received interrupt, control proceeds to step 506. In step 506, the protocol identifier of the received broadcast is determined. The protocol identifier may be of different types such as a tag-identifier broadcast, a tag identifier map broadcast, etc. Exemplary formats of the tag-identifier broadcast, the central authority broadcast and the tag identifier map broadcast are shown in FIGS. 6a, 6b, and 6c respectively. The broadcasts may be encapsulated in a wireless broadcast packet at the network-interface layer and multi-byte values may be transmitted in big endian order. The signatures may be RSA signatures. The signature in the tag identifier broadcast may be taken over the tag identifier and current time fields. The signature in the central authority broadcast may be taken over the current time field. One or more of the fields excluding the protocol identifier in the tag identifier map broadcast may be encrypted with the public key of the central authority. The signature in the tag identifier may be taken over one or more of the fields following the current time.

If the protocol identifier is a tag identifier broadcast, control proceeds to step 508. In step 508, the tag identifier of the tag identifier broadcast is checked to determine if it is valid. If it is not valid, the broadcast is ignored and control returns to step 502. If it is valid, control proceeds to step 510. In step 510, the time in the tag identifier broadcast is checked to determine whether it is within one minute of the current time. If it is not, then the broadcast is ignored and control returns to step 502. If it is, then control proceeds to step 512. In step 512, the tag identifier in the tag identifier broadcast is checked to determine whether it is present in the tag identifier map (i.e., has been previously encountered by the tag). If not, control proceeds to step 514. In step 514, a new entry is created for the tag identifier in the tag identifier map and the number of encounters for that entry is set to one. Control then proceeds to step 502.

If the tag identifier is determined to be present in the tag identifier map in step 512, then control proceeds to step 516. In step 516, it is determined whether the tag identifier in the tag identifier broadcast has a public key. If so, then control passes to step 518. In step 518, the public key is used to verify the signature. If the signature verification in step 518 is not successful, then the broadcast is ignored and control returns to step 502. If the signature verification in step 518 is successful, then control proceeds to step 520. In step 520, the number of encounters for the tag identifier in the tag identifier map is incremented.

If the protocol identifier is determined to be a central authority broadcast in step 506, then control proceeds to step 522. In step 522, the time in the central authority broadcast is checked to determine if it is within one minute of the current time. If not, then the broadcast is ignored and control returns to step 502. If so, control proceeds to step 524. In step 524, the public key of the central authority is used to verify the signature in the central authority broadcast. If the signature verification is not successful, then the broadcast is ignored and control returns to step 502. If the signature verification in step 524 is successful, then control proceeds to step 526. In step 526, the tag identifier map is encrypted with the central authority public key. In step 528, the encrypted tag identifier map is broadcast. Control then returns to step 502.

If the interrupt is determined to be a timer interrupt in step 504, control proceeds to step 530. In one embodiment, the timer interrupt occurs every 15 seconds. In step 530, the signature is created using the tag's private key. In step 532, the signature, the tag identifier, and the current time are written to the tag identifier broadcast. In step 534, the tag identifier broadcast is broadcast. Control then returns to step 502.

The embodiment of FIG. 5 has a number of advantages. The signature makes it infeasible for any preregistered tag to spoof a real tag. Replay attacks are blocked by the time stamp.

The private keys may be secured; the central authority may be in a secure location; and the tags may be tamper-resistant. These options prevent one tag from repudiating contact with another tag. A replacement strategy may be used to prevent attempts to flood the tag identifier map by broadcasting of spurious tag identifiers. In another embodiment, a global public/private key pair may be used to authenticate broadcasts.

Another embodiment of the invention sounds an alarm within a predetermined time if a tag goes outside a particular range of one or more other tags. In one embodiment, the range is a mutual transmit/receive range. In one embodiment the predetermined time is sixty seconds. One tag may be physically attached to a sensitive object that must not leave a secure area. The other tag may be built into a secure, immobile location such as a floor or ceiling or may be carried by authorized personnel. In one embodiment, a protocol enables and disable tags so that objections can be removed by authorized parties.

This embodiment may be used to alert security personnel to the movement of objects out of a secure facility, to alert employees to theft of inventory from a store, to alert a parent or day-care provider to a child that strays outside of a certain area, to alert a person to the theft of a motor vehicle, or to the theft of valuable objects from the home, to alert a escort in a secure facility of abandonment by a guest, to alert the authorities of the escape of a criminal from prison or from a house for those criminals under house arrest, etc.

In one embodiment, the tags may contain one or more of the following: a radio transmitter, a radio receiver, a memory, control software, a processor, a clock and an audible alarm. The memory may include a RAM and a ROM. The control software may be stored in the ROM. The processor may be of a type that consumes less power.

The tags may contain one or more data structures including a tag identifier, a tag identifier of a partner tag, a private key for the tag, a public key for the partner tag, a public key of a control authority, an alarm counter, an enable flag and a time field. The tag identifier may be a variable length string of up to 255 bytes and may be used to distinguish tags from each other. The tag identifier of the partner tag may be a variable length string of up to 255 bytes. The private and public keys may be 16 bytes. The alarm counter may be four bytes. The enable flag may be four bytes. The time field may be a four byte unsigned integer and may contain the current time in any form such as Greenwich Mean Time (GMT).

Figure 7:
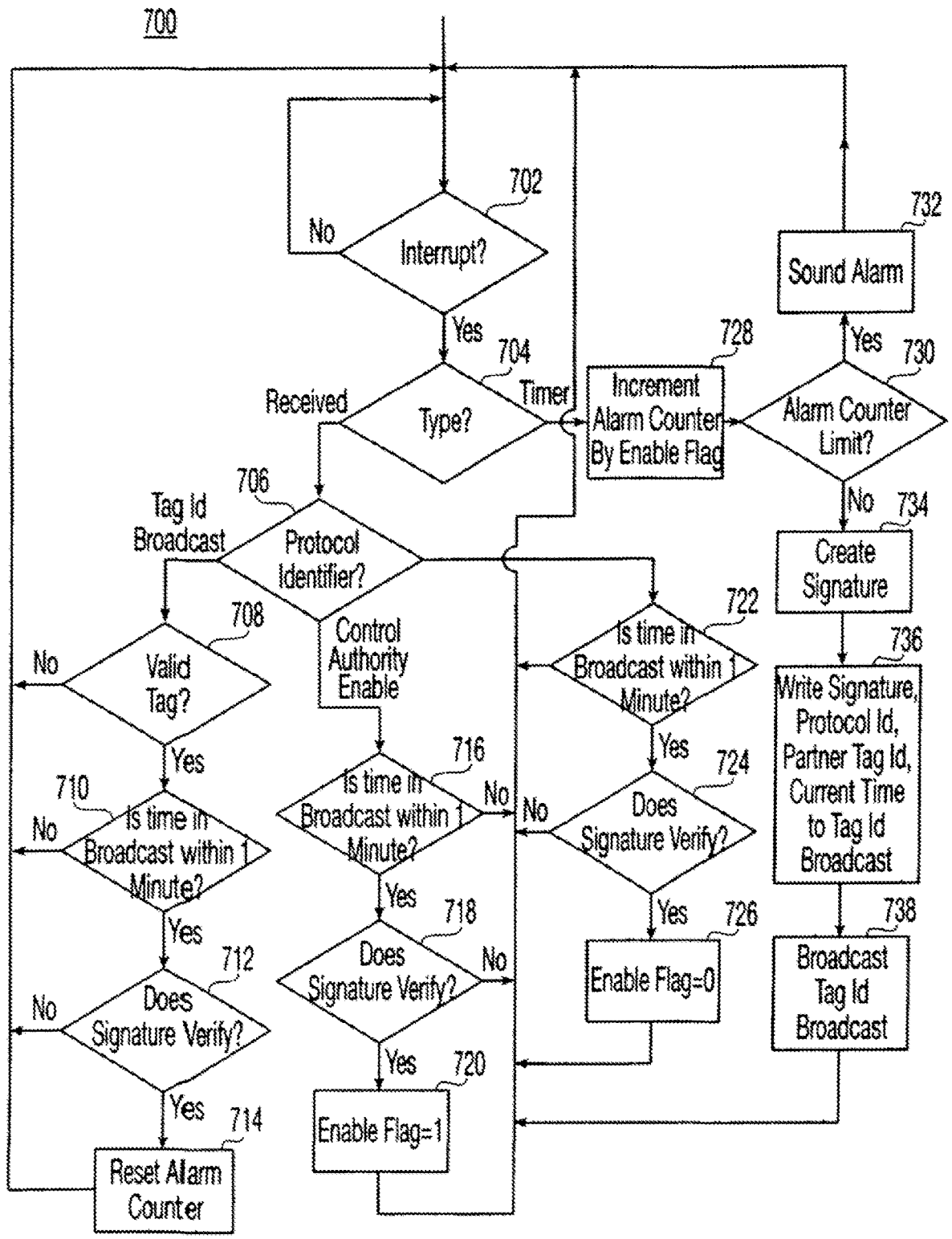
FIG. 7 is a data flow diagram illustrating the operation of one embodiment of a tag for an out-of-proximity alarm.

FIG. 7 is a data flow diagram 700 illustrating the operation of one embodiment of a tag for an out-of-proximity alarm. The tag waits for an interrupt in step 702. In step 704, the type of interrupt is determined. If the interrupt is a received interrupt, control proceeds to step 706. In step 706, the protocol identifier of the received broadcast is determined. The protocol identifier may be of different types such as a tag-identifier broadcast, a control-authority broadcast (including a control authority enable and a control authority disable), etc. Exemplary formats of the tag-identifier broadcast, the control authority enable and the control authority disable are shown in FIGS. 8a, 8b, and 8c respectively. The broadcasts may be encapsulated in a wireless broadcast packet at the network-interface layer and multi-byte values may be transmitted in big endian order. The signature in the tag identifier broadcast may be taken over the tag identifier and current time fields. The signature in the control-authority broadcast may be taken over the current time field. The signatures may be RSA signatures.

If the protocol identifier is a tag identifier broadcast, control proceeds to step 708. In step 708, the tag identifier of the tag identifier broadcast is checked to determine if it is valid. If it is not valid, the broadcast is ignored and control returns to step 702. If it is valid, control proceeds to step 710. In step 710, the time in the tag identifier broadcast is checked to determine whether it is within one minute of the current time. If it is not, then the broadcast is ignored and control returns to step 702. If it is, then control proceeds to step 712. In step 712, the public key of a partner tag may be used to verify the signature in the tag-identifier broadcast. If the signature verification in step 712 is not successful, then the broadcast is ignored and control returns to step 702. If the signature verification in step 712 is successful, then control proceeds to step 714. In step 714, the alarm counter is reset to zero.

If the protocol identifier is determined to be a control authority enable broadcast in step 706, then control proceeds to step 716. In step 716, the time in the control authority enable broadcast is checked to determine if it is within one minute of the current time. If not, then the broadcast is ignored and control returns to step 702. If so, control proceeds to step 718. In step 718, the public key of the control authority is used to verify the signature in the control authority enable broadcast. If the signature verification is not successful, then the broadcast is ignored and control returns to step 702. If the signature verification in step 718 is successful, then control proceeds to step 720. In step 720, the enable flag is set to one. Control then returns to step 702.

If the protocol identifier is determined to be a control authority disable broadcast in step 706, then control proceeds to step 722. In step 722, the time in the control authority disable broadcast is checked to determine if it is within one minute of the current time. If not, then the broadcast is ignored and control returns to step 702. If so, control proceeds to step 724. In step 724, the public key of the control authority is used to verify the signature in the control authority enable broadcast. If the signature verification is not successful, then the broadcast is ignored and control returns to step 702. If the signature verification in step 724 is successful, then control proceeds to step 726. In step 726, the enable flag is set to zero. Control then returns to step 702.

If the interrupt is determined to be a timer interrupt in step 704, control proceeds to step 728. In one embodiment, the timer interrupt occurs every six seconds. In step 728, the enable flag is added to the alarm counter. In step 730 the alarm counter is checked to determine if it is greater than a limit. In one embodiment, the limit may be 10 seconds. If the alarm counter is greater than the limit, control proceeds to step 732. In step 732, the tag sounds an alarm. Control then proceeds to step 702.

If the alarm counter is determined to be less than or equal to the limit in step 730, then control proceeds to step 734. In step 734, a signature is created using the tag's private key. In one embodiment, the signature is taken over the tag identifier of a partner and the current time. In step 736, the signature, the protocol identifier, the tag identifier of a partner, and the current time are written to the tag identifier broadcast. In step 738, the tag identifier broadcast is broadcast. Control then returns to step 702.

The embodiment of FIG. 7 has a number of advantages. The signature makes it infeasible for a phony partner tag to spoof a real tag. The signature also makes it infeasible for a phony control authority to disable a tag. Replay attacks are blocked by the time stamp. Destroying a tag sounds the alarm of a partner tag.

Another embodiment of the invention sounds an alarm if a tag comes within a particular range of one or more other tags. Each tag may maintain a sensitive tag list of such other tags that cause its alarm to sound. In one embodiment, the range is a mutual transmit/receive range. One tag may be physically attached to a sensitive object that must not enter a secure area. The other tag may be built into a secure, immobile location such as a floor or ceiling or may be carried by authorized personnel. This embodiment may include a protocol for adding tags to and deleting tags from the sensitive tag list.

This embodiment may be used to alert security personnel to the movement of objects such as dangerous or hazardous object into a sensitive facility, to alert employees to inventory that is being carried near the exit of a store, to alert a parent or child-care provider to the movement of a child toward a dangerous area or to designated persons, to warn a pedestrian who is approaching a hazardous area, to warn a motor-vehicle driver who is approaching hazardous conditions, to alert security personnel to visitors who are entering or approaching a restricted area, etc.

In one embodiment, the tags may contain one or more of the following: a radio transmitter, a radio receiver, a memory, control software, a processor, a clock and an audible alarm. The memory may include a RAM and a ROM. The control software may be stored in the ROM. The processor may be of a type that consumes less power.

The tags may contain one or more data structures including a tag identifier, a private key for the tag, a public key of a control authority, a tag identifier map, and a time field. The tag identifier may be a variable length string of up to 255 bytes and may be used to distinguish tags from each other. The private and public keys may be 16 bytes. The tag identifier map may map a sensitive tag identifier to a public key. The tag identifier map may be implemented by a hash table or a binary search tree. Entries in the tag identifier map may expire in least-recently-used order if the tag identifier map becomes full. The time field may be a four byte unsigned integer and may contain the current time in any form such as Greenwich Mean Time (GMT).

Figure 9:
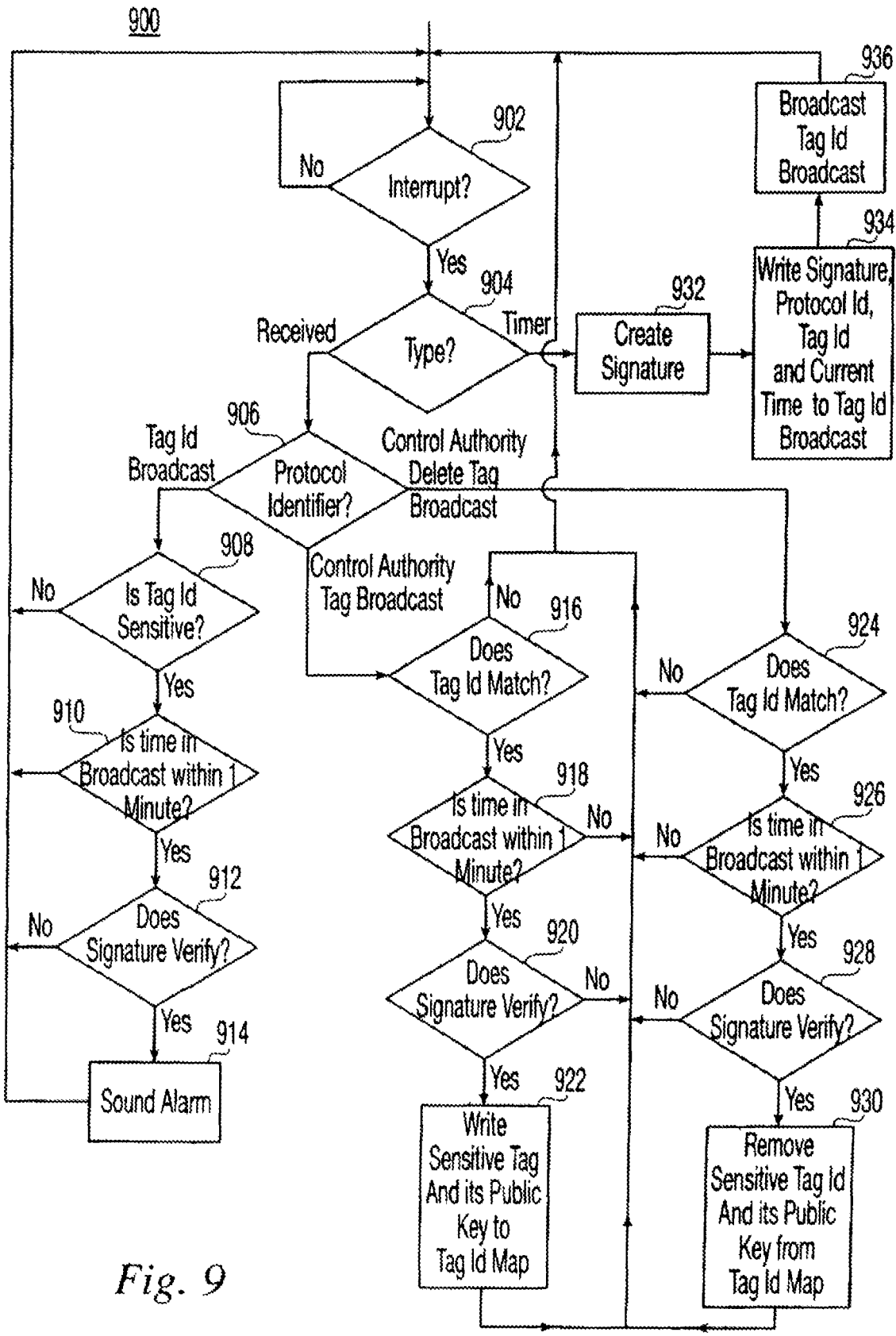
FIG. 9 is a data flow diagram illustrating the operation of one embodiment of a tag for a symmetric proximity alarm.

FIG. 9 is a data flow diagram 900 illustrating the operation of one embodiment of a tag for a symmetric proximity alarm. The tag waits for an interrupt in step 902. In step 904, the type of interrupt is determined. If the interrupt is a received interrupt, control proceeds to step 906. In step 906, the protocol identifier of the received broadcast is determined. The protocol identifier may be of different types such as a tag-identifier broadcast, a control-authority add tag broadcast, a control authority delete tag broadcast, etc. Exemplary formats of the tag-identifier broadcast, the control authority add tag broadcast and the control authority delete tag broadcast are shown in FIGS. 10a, 10b, and 10c respectively. The broadcasts may be encapsulated in a wireless broadcast packet at the network-interface layer and multi-byte values may be transmitted in big endian order. The signatures may be RSA signatures. The signature in the tag identifier broadcast may be taken over the tag identifier and current time fields. The signature in the control-authority add tag broadcast may be taken over the target tag identifier, the sensitive tag identifier, the sensitive tag public key and the current time field. The signature in the control-authority delete tag broadcast may be taken over the target tag identifier, the sensitive tag identifier, and the current time field.

If the protocol identifier is a tag identifier broadcast, control proceeds to step 908. In step 908, the tag identifier of the tag identifier broadcast is checked to determine if it is in the tag's list of sensitive tags. If it is not in the list of sensitive tags, the broadcast is ignored and control returns to step 902. If it is in the list of sensitive tags, control proceeds to step 910. In step 910, the time in the tag identifier broadcast is checked to determine whether it is within one minute of the current time. If it is not, then the broadcast is ignored and control returns to step 902. If it is, then control proceeds to step 912. In step 912, the public key of the tag identifier in the tag identifier broadcast may be used to verify the signature in the tag-identifier broadcast. If the signature verification in step 912 is not successful, then the broadcast is ignored and control returns to step 902. If the signature verification in step 912 is successful, then control proceeds to step 914. In step 914, the alarm sounds.

If the protocol identifier is determined to be a control authority add tag broadcast in step 906, then control proceeds to step 916. In step 916, the target tag identifier is checked to determine if it matches the tag identifier of the tag receiving the broadcast. If there is not a match, the broadcast is ignored and control returns to step 902. If there is a match, control proceeds to step 918. In step 918, the time in the control authority add tag broadcast is checked to determine if it is within one minute of the current time. If it is not, then the broadcast is ignored and control returns to step 902. If it is within one minute, control proceeds to step 920. In step 920, the public key of the control authority is used to verify the signature in the control authority add tag broadcast. If the signature verification is not successful, then the broadcast is ignored and control returns to step 902. If the signature verification in step 920 is successful, then control proceeds to step 922. In step 922, the sensitive tag identifier in the control authority add tag broadcast and its public key are stored in the tag identifier map. Control then returns to step 902.

If the protocol identifier is determined to be a control authority delete tag broadcast in step 906, then control proceeds to step 924. In step 924, the target tag identifier is checked to determine if it matches the tag identifier of the tag receiving the broadcast. If there is not a match, the broadcast is ignored and control returns to step 902. If there is a match, control proceeds to step 926. In step 926, the time in the control authority delete tag broadcast is checked to determine if it is within one minute of the current time. If it is not, then the broadcast is ignored and control returns to step 902. If it is within one minute, control proceeds to step 928. In step 928, the public key of the control authority is used to verify the signature in the control authority delete tag broadcast. If the signature verification is not successful, then the broadcast is ignored and control returns to step 902. If the signature verification in step 928 is successful, then control proceeds to step 930. In step 930, the sensitive tag identifier in the control authority delete tag broadcast and its public key are removed from the tag identifier map. Control then returns to step 902.

If the interrupt is determined to be a timer interrupt in step 904, control proceeds to step 932. In one embodiment, the timer interrupt occurs every fifteen seconds. In step 932, a signature is created using the tag's private key. In one embodiment, the signature is taken over the tag identifier and the current time. In step 934, the signature, the protocol identifier, the tag identifier, and the current time are written to the tag identifier broadcast. In step 936, the tag identifier broadcast is broadcast. Control then returns to step 902.

The embodiment of FIG. 9 has a number of advantages. The signature makes it infeasible for a phony sensitive tag to spoof a real tag. The signature also makes it infeasible for a phony control authority to add or delete a tag. Replay attacks are blocked by the time stamp. Tags may be made to be resistant to tampering to lessen their vulnerability to physical destruction or removal.

Figure 11:
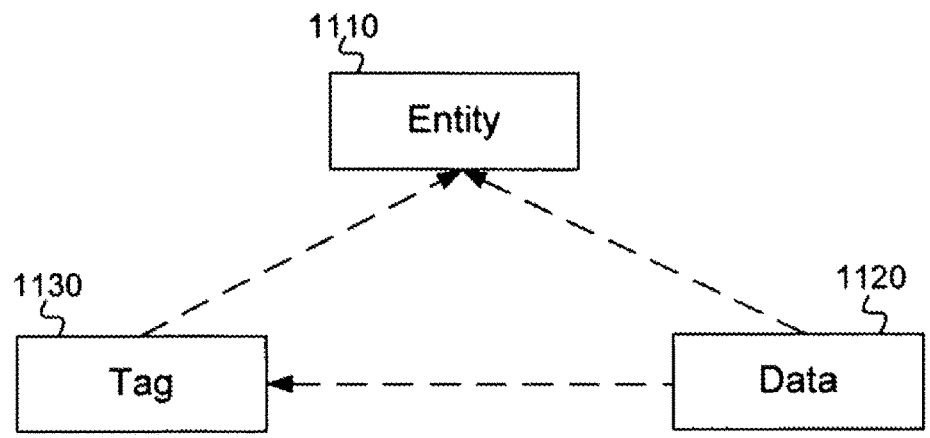
FIG. 11 illustrates an association between a tag and its associated entity's associated data.

In another embodiment of the invention, entities may be associated with tags. Entities and tags may be associated with data. This is illustrated in FIG. 11 with Entity 1110, Data 1120 and Tag 1130. A tag may identify its associated entity. Tags may be of different types including RFID tags and laser tags.

The associations may be of different types such as one-to-one and many-to-one. Associations between a tag and an entity may be physical or logical. Exemplary physical associations include attaching the tag to or inserting the tag into, its associated entity. Examples of physical entities that may be associated with tags may include people, animals, plants, real property such as house, lots, condominiums, mobile homes and townhomes, and valuable items such as paintings, diamonds, jewelry, watches, and antiques. Additional examples include movable items such as automobiles, airplanes, military vehicles, bicycles, motorcycles, boats and ships.

Examples of logical entities that may be associated with tags may include parts of containers, a spatial location, a temporal location, an environmental condition (e.g. hurricane), an abstraction, and a concept.

Various types of data may be associated with a tagged entity. Examples may include common types of data (e.g., addresses, dates, invoice numbers) and transactions (e.g., purchases, requests for quotes).

Examples of data that may be associated with a product entity include the product's name and class (e.g., soft drink, automobile part, clothing), manufacturing date and place, expiration date, current location, and current temperature. Additional examples include instructions for where a product may be shipped, instructions for a point-of-sale display to lower the price as a product approaches its expiration date, instructions for how long a particular type of microwave oven should cook a particular brand of frozen pizza, and instructions indicating that goods be stored at a particular temperature as they are transported.

Additional types of data that may be associated with a tagged entity include information that does not change such as material composition, information that changes constantly (dynamic data) and information that changes over time (temporal data). Dynamic data may include the temperature of a shipment of fruit and vibration levels of a machine. Temporal data may change discretely and intermittently over the life of an entity. Temporal data may include the location of an entity.

Data associated with tagged entities may be stored in a conventional database or a web page and may be described with a mark up language such as the Physical Markup Language (PML). FIG. 12 illustrates an exemplary, abbreviated PML file. The PML file contains two temperature readings for a product. PML is based on extensive Markup (meta) Language (XML). PML is described in R. Journal, The EPC global Network: FAQ: What is the PML?, Dec. 14, 2005, www.rfidjournal.com/faq/24/116, the contents of which are herein incorporated by reference.

Figure 18:
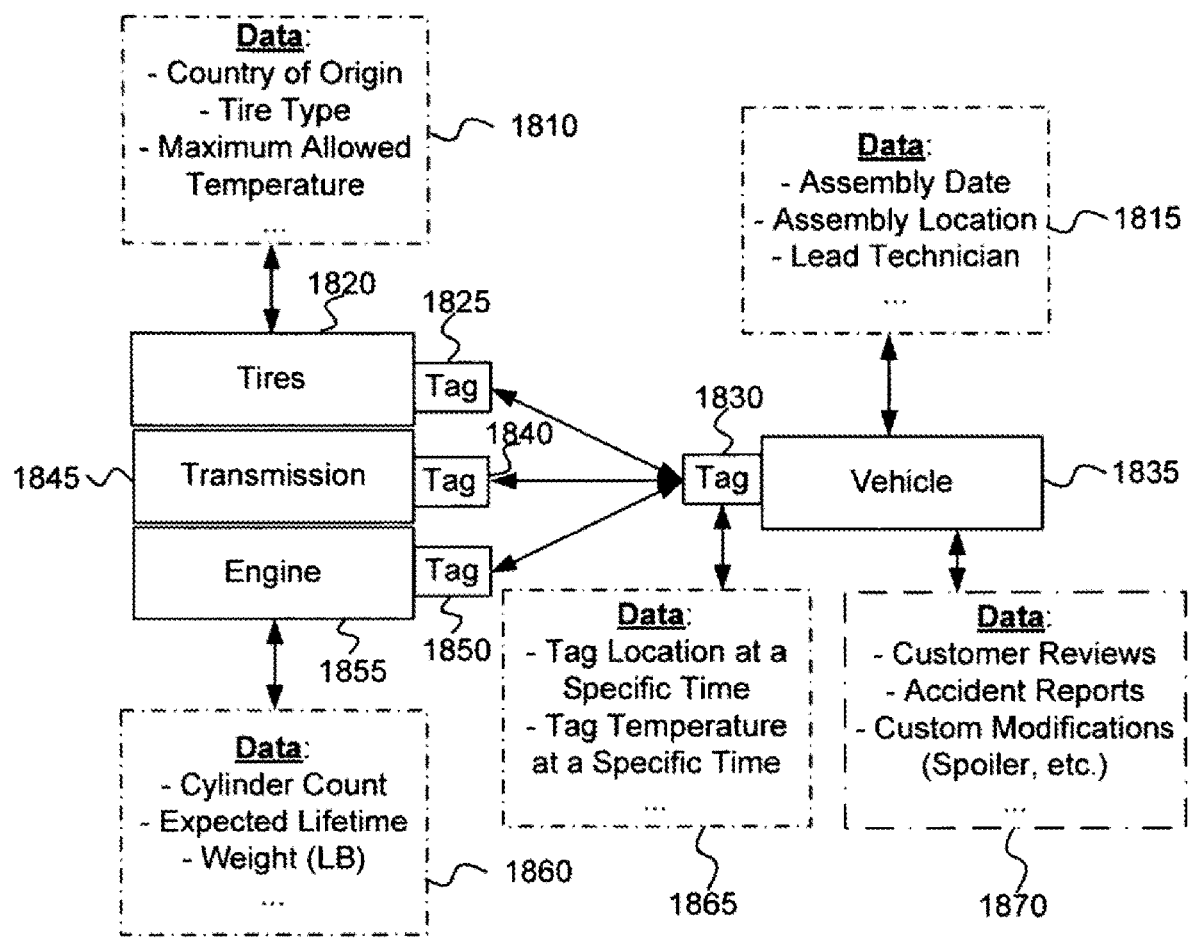
FIG. 18 shows an example of data may be associated with tags as well as entities, and the tags and entities are themselves associated with each other.

A set of primary data for a tagged entity such as a tag identifier, a time, a tag reader identifier and the GPS coordinates of the tag reader may be called a tag event. A tag event may further include sensor data (e.g., a temperature measurement) as shown by Data 1865 in FIG. 18.

Data associated with a tagged entity including tag event data and PML data may be accessed through a tag data repository or tag data server. A tag data repository may be any data repository (e.g., database, web server, PML file) containing tag data. A tag data repository may associate each tag event with a tag identifier. Because each tag identifier is associated with an entity and that entity may be associated with data besides event data, such as Data 1870 in FIG. 18, the tag identifier may be associated with data besides event data. For example, a tag identifier may be associated with a particular car (Tags 1830 and 1835, FIG. 18), and that car may be associated with a variety of data (e.g., a manufacturing date), as illustrated by Data 1815 in FIG. 18. Thus, the car's tag identifier may be associated with the car's manufacturing date. Physical entities may be associated with tag identifiers of their parts. For example, a car may be associated with the tag identifiers of its parts, as shown by the association between Tags 1825, 1830, 1840 and 1850, and Parts (or entities) 1820, 1845 and 1855 of FIG. 18. Thus, the car's tag identifier may be associated with the tag identifiers of the car's parts, as well as Data 1810 and 1860. Since car parts may have parts of their own, a tag identifier may be associated with a part hierarchy. In general, a tag identifier may be the root of a tree of associated tag identifiers. Although such data may not be tag event data, it nonetheless can be associated with a tag identifier. A tag's associated tag identifiers may be referred to as its tag references.

The set of all tags and their tag references may be represented as a directed graph. In such a graph, the tags may be represented as nodes and the tag references may be represented as arcs. The set of tag data including tag event data and other data may be referred to as the universe of data.

Figure 13:
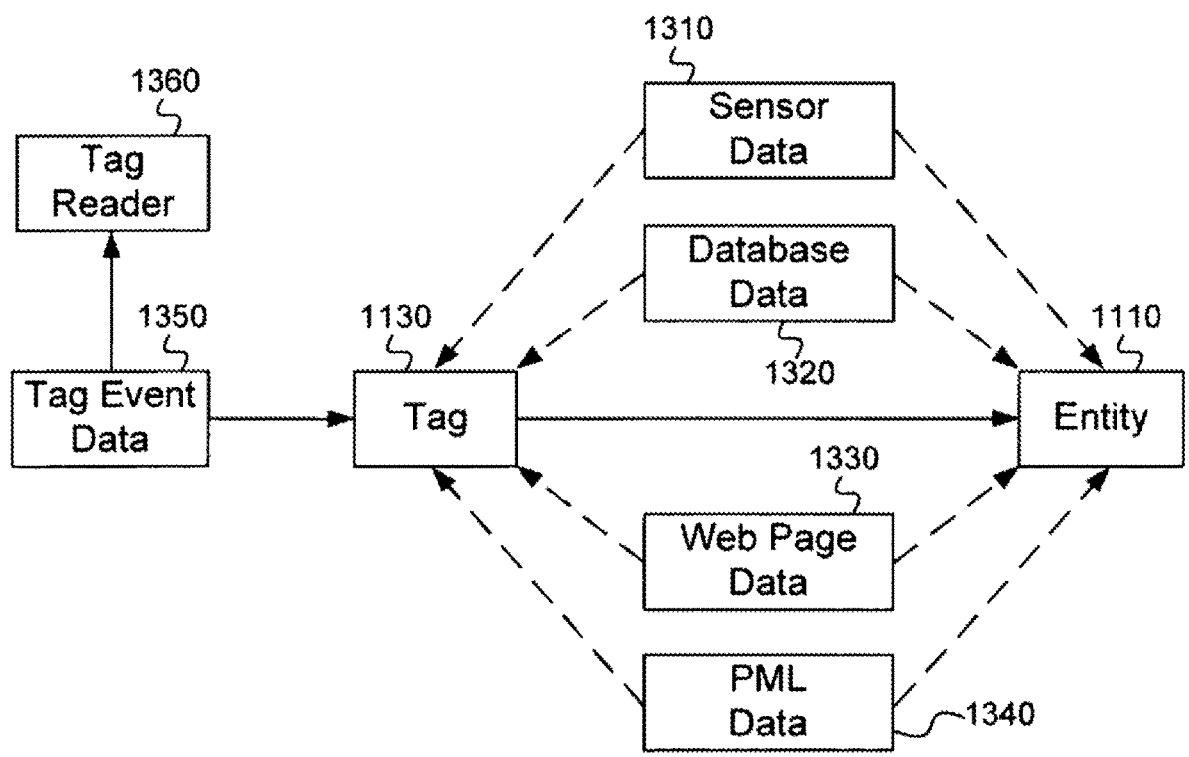
FIG. 13 illustrates some exemplary data sources that may be associated indirectly with tag data.

FIG. 13 presents some exemplary tag data repositories, including Sensor Data 1310, Database Data 1320, Web Page Data 1330, and PML Data 1340.

Figure 14:
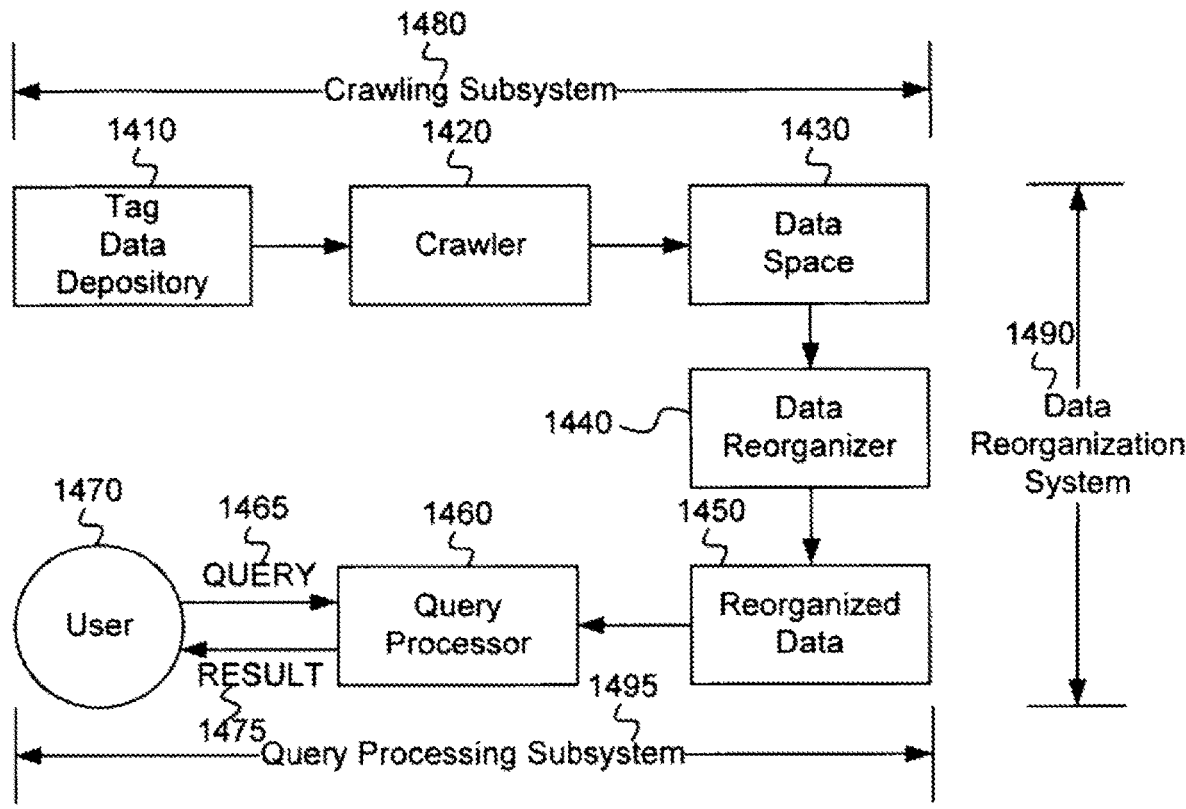
FIG. 14 is a block diagram showing the main operational elements of one embodiment of the invention.

FIG. 14 is a block diagram showing the main components of one embodiment of the invention. The embodiment may be arranged into a crawling subsystem 1480, a data reorganization subsystem 1490 and a query processing subsystem 1495.

The Crawling Subsystem

Crawling may involve three principle tasks, data discovery, authentication and authorization, and automatic parsing and semantic processing. Various participants and components in the present invention cooperate to facilitate these tasks. Tag data procedures (e.g., manufacturers, distributors, retailers, consumers) have the incentive to have their data discovered in order to maximize its value. This incentive will grow with the continued growth of electronic commerce.

Tag data servers and TDS servers also facilitate discovery of the tag data produced by tag data producers. A TDS server is a service that returns information about tag data repositories or tag data servers for which an entity's data may be accessed. In one embodiment, descriptions of entity attributes (static, temporal, and dynamic) are accessed indirectly via TDS servers that are distributed within computer networks such as the Internet or an intranet.

In addition to facilitating the discovery of data, the tag data repositories, tag data servers, and TDS servers may participate with a crawler in authentication and authorization. Specifically, a crawler may submit to authentication. If the crawler is authenticated, the crawler's authorization may be checked. The tag data repository, tag data server and TDS server may then grant access to these portions of their contents to which the crawler has authorization.

In one embodiment of the present invention, the Physical Markup Language (PML) facilitates automatic processing and semantic processing.

Figure 15:
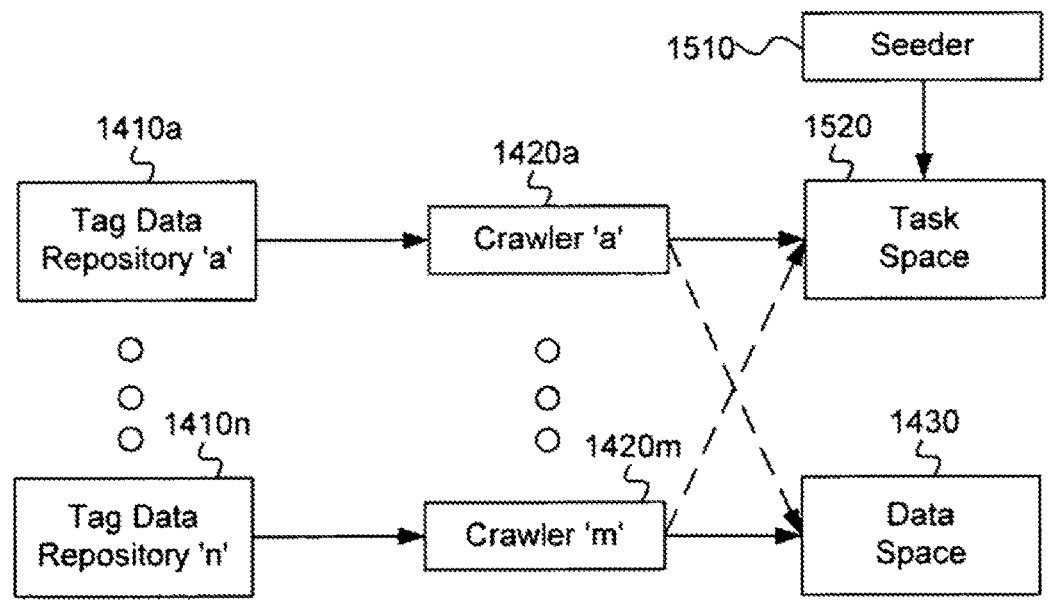
FIG. 15 is a schematic of the Crawling Subsystem of one embodiment of the invention.

As shown by FIG. 14, the Crawling Subsystem 1480 may include a tag data repository 1410, a crawler 1420, and a data space 1430. FIG. 15 is a schematic of the crawling subsystem 1480 of one embodiment of the invention. A crawler 1420a . . . 1420m may access tag data either directly or indirectly for a variety of tag data repositories 1410a . . . 1410n. The crawler 1420a . . . 1420m may send the accessed data to a data space 1430 within the data reorganization system 1490. In one embodiment, a crawling system 1480 may further include Seeder 1510 and a Task Space 1520. The Seeder 1510 may initialize the Task Space 1520 with data acquisition tasks.

While the task space 1520 is not empty, an idle crawler 1410a . . . 1410n will take a data acquisition task from the task space 1520, acquire the data, and put the acquired data in the result data space 1430. A crawler, 1420a . . . 1420m, when processing a task, may discover additional repositories 1410a . . . 1420n. For example, when the acquired data contains a tag reference, the Crawling Subsystem 1480 might hand this tag to a TDS server. For each returned tag data repository 1410a . . . 1410n, a tag data server that was previously unknown to the Crawling Subsystem 1480, it may construct a new data acquisition task. In general, a crawling task, in addition to producing a result for insertion into the data space 1430, may produce new data acquisition tasks for insertion in the Task space 1520. When all the tasks that were put into the Task space 1520 have been completed (which implies that no new tasks will be generated), crawling is complete.

The Seeder 1510 may initialize the Task space 1520 by accessing a file of initial data acquisition tasks and/or by systematically retrieving information about tag data repositories 1410a . . . 1410n and tag data servers from TDS servers. The Seeder configuration file may be updated with the information regarding newly discovered tag data repositories 1410a . . . 1410n, tag data servers, and TDS servers. In one embodiment, the Task space 1520 and result space 1430 may be distributed. The result space 1430 is the interface between the Crawling Subsystem 1480 and the Data Reorganization Subsystem 1490.

The Data Reorganization Subsystem

As shown in FIG. 14, the Data Reorganization Subsystem 1490, may include Data Space 1430, Data Reorganizer 1440, and Reorganized Data 1450. The Data Reorganization Subsystem 1490 accesses the tag data that was acquired for the crawling subsystem 1480 and produces data structures that facilitate query processing. This conversion may be illustrated using the exemplary, abbreviated PML file of FIG. 12. In one embodiment, appropriate data structures such as relations for a relational database are constructed for a tag data scheme in a PML file like the one illustrated in FIG. 12. For example, a ternary relation <tag identifier, datetime, temperature> may be updated with two rows corresponding to the two recorded temperature readings. Such conversions to tuples in a relational database may be referred to as shredding. An explanation of shredding in the XML context may be found in R. Krishnamurthy, et al., XML-to-SQL Query Translation Literature: The State of the Art and Open Problems, XML Symposium, 2003, the contents of which are herein incorporated by reference.

In one embodiment, the aggregation of the output of the Crawling Subsystem 1480 (e.g., PML files and relational structures of tag data) may be done with the use of data management systems, such as DB2. DB2 is capable of managing XML and relational data natively. In other words, each kind of data may be kept in a data structure that is inherently suited for that data. In the case of XML, for example, data is kept in a tree-like data structure. Because the database in the embodiment manages both XML and relational data natively, shredding is unnecessary. XML support within DB2 is further explained in M. Nicola and B. van den Linden, Native XML Support in DB2 Universal Database, Proceedings of the 31$_{st}$ VCDB Conference, 2005, Trandheim, Norway, www.vldb 2005.org/program/paper/ thu/p1164-nicola.pdf, (hereinafter, "Native XML Support in DB2 Universal Database") the contents of which are herein incorporated by reference.

In one embodiment, the data structure may be further optimized. For example, relations in a relational database may be put in normal form. In addition, indices may be constructed. These and other optimizations are described in "Native XML Support in DB2 Universal Database." In another embodiment, the index may be a spatial index which spatially orders tag data associated with space-varying (i.e., mobile) entities. A spatial index may facilitate, for example, the identification of entities that were "nearly" co-located (not necessarily at the same time). Another index may be a temporal index, which temporally orders time-varying tag data (e.g., the temperature readings in FIG. 2). A temporal index may allow queries to access tag data of an entity at or near a particular time, as well as time-varying tag data associated with one entity, as a function of the time that another entity's time-varying data (e.g., temperature) was in a certain value interval. Another index may be a temporal-spatial index, which orders entity data spatially within time. Such an index facilitates processing queries that require the determination of what entities were, for example, near entity A near time t.

In one embodiment, the tag data associated with one entity may refer to other entities (e.g., in part-whole relations, such as what particular carburetor is in this particular car).

In one embodiment, the invention may include a ranking algorithm. Ranking algorithms are described in D. Woolsey and M. Every's "method and apparatus for improved relevance of search results," (U.S. patent application Ser. No. 10/863,543 published on Sep. 15, 2005 as U.S. patent publication number 20050203888) the contents of which are herein incorporated by reference. Keyword queries respond with tag data that is highly ranked with respect to the keywords. In one embodiment, the ranking algorithm may be a pluggable attribute. In one embodiment, the invention responds to keyword queries with tag data that is highly ranked for those keywords.

In another embodiment, the result of the first step in a keyword search may be a set of tag identifiers. Next, tag data associated with each tag identifier is aggregated, regardless of whether or not the source of the tag data is distributed over many data repositories (e.g., manufacture repository, shipping repositories and a retailer repository). Thus, the present invention is an enhancement over a conventional web search engine, which merely retains a list of weblinks that match a query but does not aggregate content from different web pages.

Figure 16:
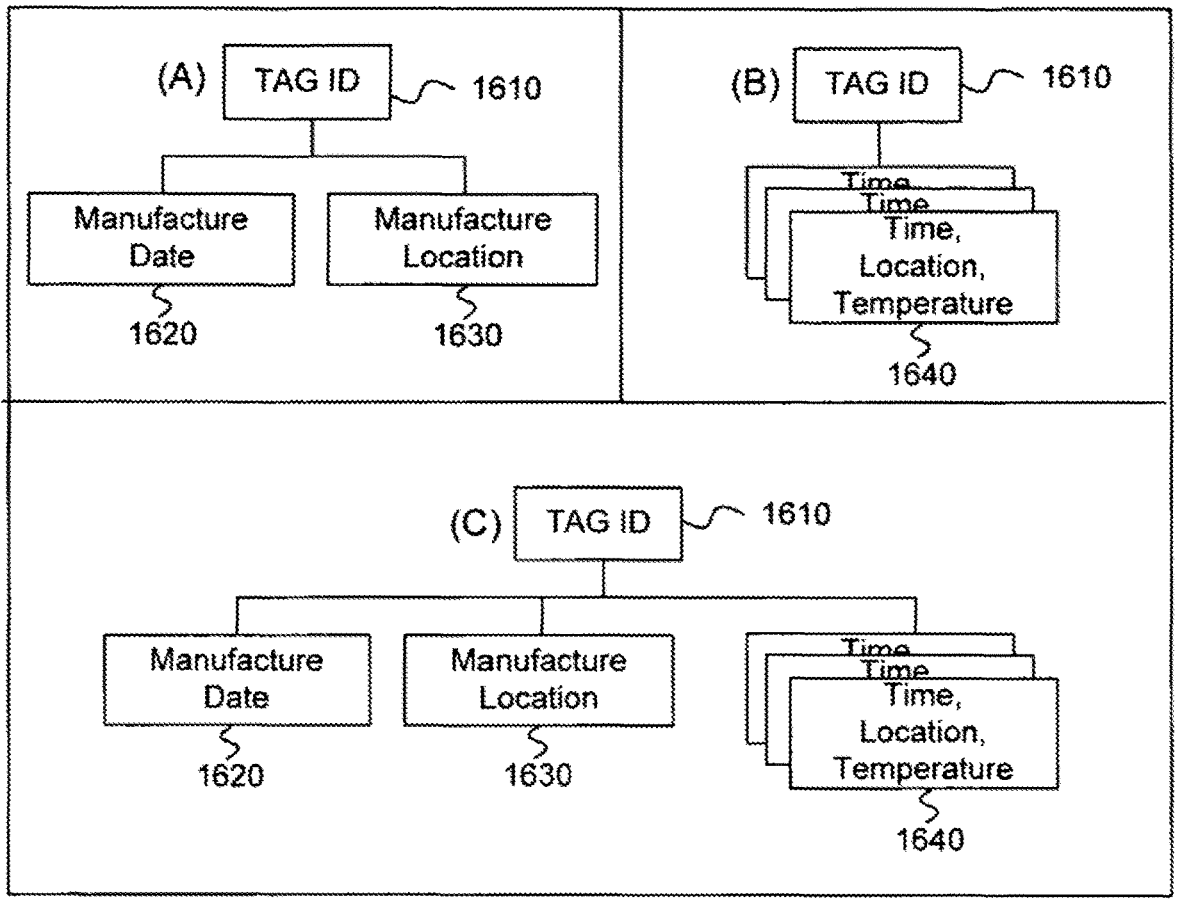
FIG. 16 shows, in block (A), an exemplary hierarchical tag data file from a manufacturer.
Figure 17:
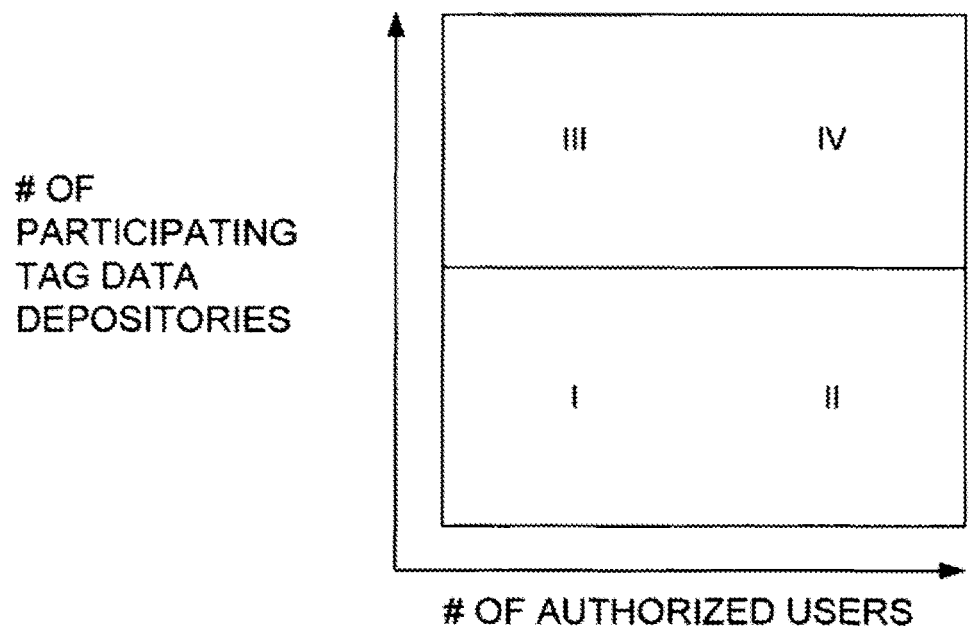
FIG. 17 shows a 2-dimensional taxonomy of some exemplary embodiments of the invention: number of tag data repositories vs. number of authorized users.

In one embodiment, aggregation is performed on PML structural data files associated with the same tag data repositories 1410a . . . 1410n. FIG. 16 shows, in blocks (A) and (B), exemplary archival data files from a manufacturer and a distributor, respectively. The data files may include TAG ID 1610, Manufacture Date 1620, Manufacture Location 1630, and Time, Location, Temperature 1640. FIG. 16 further shows, in block (C), the identification of hierarchies in blocks (A) and (B) based on the tag identifier values. To create the hierarchical data file in block (C) from the files in blocks (A) and (B), distinct trees with the same root value (the same tag identifier) are combined. In other words, it is sufficient to identify the roots of the distinct trees. The resulting tree is the union of the constituent tree.

In one embodiment, the crawling acts in accordance with a "push" model of data acquisition. In another embodiment, the crawling may also act in accordance with a "pull" acquisition model. In one embodiment, the acquisition may be triggered by event notification. Because they are more network intensive, the acquisitions that are triggered may be reserved for the most volatile data when increased tag data timelines is requested.

The Query Processing Subsystem

The Query Processing Subsystem 1495 may include reorganized data 1450 produced by the data reorganization system 1490 and a query processor 1460. In one embodiment, the query processor 1460 receives a query 1465 originated by a user 1470 from a variety of sources, such as a web interface. The query processor 1460 may use the indices and/or other data structures of the reorganized data 1450 to find an answer to the query. The data processor 1460 may return the answer as a result 1475 to the user 1470.

Tag data may not be uniformly volatile. The spectrum ranges from tag data that is fixed for the lifetime of the associated entity (e.g., manufacture date) to tag data that varies nearly continuously (e.g., the location of a highly mobile tagged entity). Responding to a user query by real-time querying of retailers may not always be necessary or cost-effective. Less volatile data may be suited to periodic harvesting. An example is the harvesting of web pages by web search engines. This aspect of the invention provides an advantage over conventional query processing, such as that which is done by web search engines. The most relevant response to a single keyword search may require knowing about tag data from multiple repositories of different owners. For example, a manufacturer may store data associated with a particular item that it has manufactured. A supplier also may store data associated with that particular item. Since both tag data files have data about the same item, they will have the same tag identifier, and a tag data search/query engine will "know" that these different tag data files are associated with the same item. The present invention enables a tag identifier search/query to succeed even if it requires data from multiple original tag data source files to do so. A web search engine has no such capability. Instead, a web page's Uniform Resource Locator (URL), the global address of documents and other resources on the World Wide Web, uniquely defines that page. If that page is associated with a specific entity, and another web page also is associated with that entity, web search engines will not "know" this. Consequently, web search engines merely focus on identifying particular web pages.

Exemplary Uses of the Invention

Exemplary uses of the present invention may be illustrated by a query search and a keyword search.

To learn which are the most "important (in a sense not formally defined) computer gaming graphics card in use (as opposed to what a web site might claim), a user might formulate the following boolean expression of keywords:

"Computer gaming" AND (graphics OR video) AND (card OR accelerator)

To handle this keyword search, inverted indices may be used. An inverted index is a set of texts of the words in the texts. The index may be accessed by a search method. Each index entry gives the word and a list of texts, possibly with locations within the text, where the word occurs. For web search engines, the "text" is a web page. Given a word, the inverted index returns a list of URLs whose corresponding web pages contain that word. With the present invention, the "text" is a tag data file. Given the word, the inverted index returns a list of tag identifiers for which there is a tag data file containing that word. Inverted indices are further explained in Inverted Index Definition, www.nist.gov/dads/HTML/invertedIndex.html, the contents of which are herein incorporated by reference.

Let the keyword search involving n keywords be denoted by the keyword expression.

$keyword_1 booleanOperator_1 keyword_2 booleanOperator_2 \ldots booleanOperator_{n-1} keyword_n$, where booleanOperator is either an AND or an OR operation. Each $keyword_i$ maps to the set of tag identifiers for which there is a tag data file containing $keyword_i$. A keyword expression is associated with the set of tag identifiers that satisfy the boolean expression of keywords. In general, the expressions can be parenthesized (as is done in the illustration above). If $keyword_i$ and $keyword_j$ are connected by an AND operator the resulting set of tag identifiers is $keyword_i \cap keyword_j$; if $keyword_i$ and $keyword_j$ are connected by an OR operator the resulting set of tag identifiers is $keyword_i \cup keyword_j$.

The final result set of tag identifiers may be ordered according to a ranking scheme. The tag data associated with each tag identifier in the final result set may be presented to the user. In one embodiment of the present invention, the ranking scheme may vary or may be a pluggable feature. In one embodiment, a pluggable ranking scheme is selected at either the time of deployment or the time the search/query is formulated.

A keyword search may succeed where $keyword_i$ is in tag data from one tag data repository, $keyword_j$ is in tag data from another tag data repository, and these keywords are connected by a boolean operator. That is, conducting the keyword search on fewer data repositories (e.g., a single data repository) would fail. Thus, aggregating data for a single tag identifier over multiple tag data repositories significantly enlarges the class of searches/queries to which the present invention can successfully respond. The tag data that is returned to the user may be aggregated automatically over many different source tag data repositories (e.g., manufacturing tag data repository, distributor tag data repository, and retailer tag data repository). If a tag-ranking algorithm is used, the response will reflect those tags that, roughly speaking, are most referenced among those that match the keywords. A tag data reference from one entity to another may represent a part-whole relationship. In particular, if a computer gaming entity has a graphics or video card, its tag data may include the card's tag (along with the tags of the other components in its parts list, which incidentally may have interesting parts lists of their own, etc.). Therefore, a tag-ranking algorithm would return the tag data associated with the tags that, roughly speaking, are referenced by the most, "important" tags.

A Query Illustration

Once a database has been constructed, users can formulate, for example, SQL queries for the database. However, XML-to-SQL translation may not be necessary because the DB2 database system also supports full XQuery, SQL/XML, and XML Schema support. Imagine that the system of the present invention receives the following query:

"What are the current locations of food that originated in Bangkok, Thailand that, after last Saturday, were within 1 mile of chemicals that were in San Pedro, Calif. harbor last Saturday?"

After the relevant data has been collected, data repositories which are keyed on RFID may be created as shown below:

1. RFID, entity instance of "chemical" . . . 1 record per batch of a chemical (Source 1.1)
2. RFID, time, location . . . 1 record per batch of a chemical in a particular location at a particular time (Source 1.2)
3. RFID, entity name, location=<official address as GPS coordinates>
4. RFID, entity instance of "food" . . . 1 record per instance of a food item (Source 2.1)
5. RFID, time, location . . . 1 record per instance of a food item in a particular location at a particular time (Source 2.2)

Multiple tag data repositories may need to be crawled. The aggregation of this disparate tag data enables the answer to our query. The data repositories shown above may need to be crawled regularly. Sources 1.2 and 2.2 may need to be crawled more frequently than sources 1.1 and 2.1.

After the data repositories have been crawled and the appropriate data structures have been constructed, processing the query may proceed as follows:

1. Get the (location, radius) of San Pedro harbor.
2. Get the set of chemicals that had space coordinates within San Pedro harbor in the time interval=[Saturday, midnight; Sunday, midnight].
3. Get the (location, radius) of Bangkok, Thailand.
4. Get the set of RFIDs of food whose origin space coordinates are within Bangkok, Thailand AND have any time coordinates (i.e., existed) on or after last Saturday.
5. Get the set of time-space coordinates of food in step 4, such that the time coordinate is after last Saturday.
6. Get the set of time-space coordinates of chemicals in step 2, such that the time coordinate is after last Saturday.
7. Get the set of (food) time space coordinates from the set of step 5 that match a (chemical) space-time coordinate in step 6, where "match" is defined to mean that their time coordinates are within some epsilon and their space coordinates are within 1 mile of each other.
8. Get the set of food associated with the time-space coordinates retrieved in the previous step.
9. Return the set of last recorded space coordinates of the food retrieved in the previous step.

A Tag Data Type System

Entities that are tagged generally are related to other tagged entities. Two kinds of associations have emerged as of primary value: is a (read "is a") relations and has a (read "has a") relations. An American citizen is a human being. A Toyota is a car. A human being has a heart. An American citizen therefore has a heart. An American citizen has a right to keep and bear arms. Since not every human being is an American citizen, it is not valid to assert that "If an entity is a human, then that entity has a right to keep and bear arms. A car has a steering wheel. A Toyota therefore has a steering wheel. Type systems where each entity has a unique is a relationship are called single inheritance type systems. Such type systems give rise to a type hierarchy, whose root type is the most abstract entity. For example, in the Java programming language, Object is the root of the class hierarchy. Type systems where each entity does not necessarily have a unique is a relationship are called multiple inheritance type systems. The type graph of such an inheritance system is a directed acyclic graph. In a multiple inheritance type system, it may be that a square is a rectangle and a square is a rhombus, inheriting the right-angled property of rectangles and the equal-sided property of rhombuses.

Tag data clearly can profit from a type system for essentially the same reasons that an object-oriented programming language and/or database profits from a type system. For example, when one is declaring a Toyota's tag data, one can declare that a Toyota is a car. Since a car has a steering wheel, if the Toyota tag data specification does not include a steering wheel, it is not conforming to the car tag data "interface", and thus is in error. Such type-checking catches such errors early, and that doing so saves a lot of time and money. Searching and querying can be enriched with the reserved words is a and has. For example, issuing the search "is a vehicle AND has a battery AND "Bethesda"
might yield tag data for cars, boats, and other vehicles that have a battery and in some way are associated with Bethesda (e.g., are located in Bethesda, Md.). This search uses the fact that is a is transitive. For example, since John Smith's 1999 Toyota Corolla is a Toyota which is a car which is a vehicle, John Smith's 1999 Toyota Corolla is a vehicle. Has a, on the other hand is not transitive. If a car has a passenger and the passenger has a heart, we would not conclude that a car has a heart. We however could ask if there is an x such that a car has an x and x has a heart. A shorthand for this might be "car has a has a heart" or more briefly "car has $a^2$ heart." An extension of this is x has a*y which means there is a chain of has relations that connects x to y.

A Simple Implementation Taxonomy

Different tag data repositories of the present invention may have different authorization requirements. Indeed, the embodiments of the present invention may vary according to two dimensions: The set of tag data repositories and the set of authorized users. We thus subdivide this space into four categories, shown in FIG. 7. Category I embodiments—few authorized users querying over a few tag data repositories—may be special-purpose, advanced systems for specialized users (e.g., a corporate system for an automobile manufacturer). Category II embodiments—many authorized users querying over a few tag data repositories—may be populated with tag data repositories that contain tag data that is either public or privately owned but intended for wide dissemination (e.g., a government system of tag data, such as data associated with the physical manifestation of proposed legislation). Category III embodiments—few authorized users querying over many tag data repositories—may be used, for example, by authorized federal law enforcement agents. Category IV embodiments—many authorized users querying over many tag data repositories—might, for example, be based on the public part of a large number of tag data repositories. Such implementations may be services (e.g., a tag data analog of GOOGLE (Tagoogle)) that are widely subscribed.

While the above invention has been described with reference to certain preferred embodiments, the scope of the present invention is not limited to these embodiments. One skilled in the art may find variations of these preferred embodiments which, nevertheless, fall within the spirit of the present invention, whose scope is defined by the claims set forth below.

What is claimed is:

1. A method for deleting a tag, comprising:
receiving a message on a tag from a control authority, wherein the message includes an identifier of the tag and a signature of the control authority;
determining that the message includes a control authority delete tag protocol identifier;
determining that the message includes the identifier of the tag;
determining that the message includes the signature of the control authority; and
removing a tag identifier of a second tag that is included in the message from a tag identifier map of the tag.

2. The method of claim 1, further comprising determining that a time of the message is within a predetermined time limit to prevent a replay attack.

3. The method of claim 2, wherein the predetermined time limit is not more than one minute from a current time.

* * * * *